(12) United States Patent
White et al.

(10) Patent No.: US 11,467,808 B2
(45) Date of Patent: Oct. 11, 2022

(54) SYSTEMS AND METHODS FOR EXECUTABLE CONTENT AND EXECUTABLE CONTENT FLOW CREATION

(71) Applicant: WISETECH GLOBAL LIMITED, Alexandria (AU)

(72) Inventors: Richard White, Alexandria (AU); Zubin Appoo, Alexandria (AU); Mikhail Sverdlov, Alexandria (AU)

(73) Assignee: WiseTech Global Limited, Alexandria (AU)

( * ) Notice: Subject to any disclaimer, the term of this patent is extended or adjusted under 35 U.S.C. 154(b) by 265 days.

(21) Appl. No.: 15/749,076

(22) PCT Filed: Jul. 28, 2016

(86) PCT No.: PCT/AU2016/050676
§ 371 (c)(1),
(2) Date: Jan. 30, 2018

(87) PCT Pub. No.: WO2017/020071
PCT Pub. Date: Feb. 9, 2017

(65) Prior Publication Data
US 2018/0232216 A1    Aug. 16, 2018

(30) Foreign Application Priority Data

Jul. 31, 2015  (AU) .............................. 2015903059
Sep. 11, 2015  (AU) .............................. 2015224516
Sep. 11, 2015  (AU) .............................. 2015224517

(51) Int. Cl.
*G06F 8/34* (2018.01)
*G06F 8/38* (2018.01)
(Continued)

(52) U.S. Cl.
CPC .............. *G06F 8/38* (2013.01); *G06F 3/0482* (2013.01); *G06F 3/0486* (2013.01);
(Continued)

(58) Field of Classification Search
CPC . G06F 8/34; G06F 8/38; G06F 17/243; G06F 3/04842; G06F 3/0486; G06F 3/0482; G06F 40/174
See application file for complete search history.

(56) References Cited

U.S. PATENT DOCUMENTS 5,602,997 A * 2/1997 Carpenter ............. G06F 3/0481
715/764
5,608,898 A * 3/1997 Turpin .................. G06F 17/243
(Continued)

FOREIGN PATENT DOCUMENTS

WO    WO 2001/037170 A2    5/2001

OTHER PUBLICATIONS

European Patent Office, Extended European Search Report, EP Patent Application No. 16831965.5, Feb. 21, 2019, eight pages.
(Continued)

*Primary Examiner* — Kieu D Vu
*Assistant Examiner* — Alvaro R Calderon, IV
(74) *Attorney, Agent, or Firm* — Fenwick & West LLP

(57) ABSTRACT

Disclosed are methods and systems that allow a user to access indicia representing executable form items, click and drag them into a space on a display screen, and build a form of executable form items. The disclosed methods and systems allow the executable form items to be arranged and rearranged as the user is building the form. The form as it is being built on a display is executable as execution codes are attached the form items when the indicia is dragged onto a form view screen. A user will not need to consider how to define the manner in which the form items function. That is (Continued)

a user, in a single step, will select a form item that is a particular type to the build the form, and this form will immediately be executable. The form can then become part of a form flow.

20 Claims, 14 Drawing Sheets

(51) Int. Cl.
  *G06F 40/174* (2020.01)
  *G06F 3/0482* (2013.01)
  *G06F 3/04842* (2022.01)
  *G06F 3/0486* (2013.01)

(52) U.S. Cl.
  CPC ............ *G06F 3/04842* (2013.01); *G06F 8/34* (2013.01); *G06F 40/174* (2020.01)

(56) References Cited

U.S. PATENT DOCUMENTS

| | | | | |
|---|---|---|---|---|
| 5,745,712 | A * | 4/1998 | Turpin | G06F 8/34 715/763 |
| 5,907,704 | A * | 5/1999 | Gudmundson | G11B 27/034 717/100 |
| 6,490,601 | B1 * | 12/2002 | Markus | G06F 21/6245 715/207 |
| 6,589,290 | B1 * | 7/2003 | Maxwell | G06F 17/2247 715/224 |
| 7,168,035 | B1 * | 1/2007 | Bell | G06F 17/2247 715/234 |
| 7,346,840 | B1 * | 3/2008 | Ravishankar | G06F 16/958 715/234 |
| 7,406,660 | B1 * | 7/2008 | Sikchi | G06F 17/2264 715/236 |
| 7,415,672 | B1 * | 8/2008 | Fortini | G06F 17/2247 715/760 |
| 7,565,640 | B2 * | 7/2009 | Shukla | G06F 8/10 717/105 |
| 7,644,351 | B1 * | 1/2010 | Portnoy | G06F 40/174 715/226 |
| 8,683,315 | B2 | 3/2014 | Stover | |
| 9,886,175 | B1 * | 2/2018 | Cox | G06F 8/38 |
| 2002/0124115 | A1 * | 9/2002 | McLean | G06F 9/451 719/310 |
| 2002/0156846 | A1 * | 10/2002 | Rawat | G06F 40/174 709/203 |
| 2002/0184610 | A1 * | 12/2002 | Chong | G06F 8/20 717/109 |
| 2003/0058286 | A1 * | 3/2003 | Dando | G06F 9/451 715/853 |
| 2003/0188262 | A1 * | 10/2003 | Maxwell | G06F 17/2247 715/209 |
| 2004/0010634 | A1 * | 1/2004 | Takashima | G06F 40/174 710/1 |
| 2004/0078373 | A1 * | 4/2004 | Ghoneimy | G06Q 10/10 |
| 2004/0093417 | A1 * | 5/2004 | Perry | G06F 16/986 709/227 |
| 2005/0015715 | A1 * | 1/2005 | Honda | G06F 17/243 715/223 |
| 2005/0038868 | A1 * | 2/2005 | Spicer | G06F 17/212 709/217 |
| 2005/0086587 | A1 * | 4/2005 | Balz | G06F 17/243 715/221 |
| 2005/0096019 | A1 * | 5/2005 | Ndili | H04L 29/06 455/414.1 |
| 2005/0125715 | A1 * | 6/2005 | Di Franco | G06F 9/451 715/226 |
| 2005/0172237 | A1 | 8/2005 | Cragun et al. | |
| 2006/0074730 | A1 * | 4/2006 | Shukla | G06Q 10/06 705/7.27 |
| 2006/0074731 | A1 * | 4/2006 | Green | G06Q 10/06 |
| 2006/0074732 | A1 * | 4/2006 | Shukla | G06F 8/36 717/106 |
| 2006/0074733 | A1 * | 4/2006 | Shukla | G06F 8/10 717/105 |
| 2006/0074734 | A1 * | 4/2006 | Shukla | G06F 8/10 717/107 |
| 2006/0074735 | A1 * | 4/2006 | Shukla | G06F 8/34 705/80 |
| 2006/0074736 | A1 * | 4/2006 | Shukla | G06Q 10/06 717/100 |
| 2006/0288269 | A1 * | 12/2006 | Oppenlander | G06F 17/243 715/207 |
| 2007/0061740 | A1 * | 3/2007 | Marini | G06F 8/38 715/762 |
| 2007/0067373 | A1 * | 3/2007 | Higgins | G06F 11/3013 |
| 2007/0186150 | A1 * | 8/2007 | Rao | G06F 17/243 715/205 |
| 2007/0250769 | A1 * | 10/2007 | Bass | G06F 17/243 715/234 |
| 2007/0250783 | A1 * | 10/2007 | Wu | G06F 17/243 715/762 |
| 2007/0266328 | A1 * | 11/2007 | Vasey | G06F 40/174 715/762 |
| 2008/0126402 | A1 * | 5/2008 | Sikchi | G06F 17/2264 |
| 2008/0184102 | A1 * | 7/2008 | Selig | G06F 17/243 715/234 |
| 2008/0215996 | A1 * | 9/2008 | Vega | G06F 16/9577 715/760 |
| 2008/0244560 | A1 * | 10/2008 | Neagu | G06F 8/70 717/174 |
| 2008/0288877 | A1 * | 11/2008 | Latzina | G06F 9/451 715/762 |
| 2008/0293395 | A1 * | 11/2008 | Mathews | G06F 16/957 455/418 |
| 2009/0083617 | A1 * | 3/2009 | Hironiwa | G06F 40/143 715/222 |
| 2009/0100087 | A1 * | 4/2009 | Connell | G06F 40/186 |
| 2009/0119334 | A1 * | 5/2009 | Ahern | G06Q 10/06 |
| 2009/0177961 | A1 * | 7/2009 | Fortini | G06F 17/2247 715/239 |
| 2010/0064277 | A1 * | 3/2010 | Baird | G06F 8/71 717/120 |
| 2010/0179962 | A1 * | 7/2010 | Schuster | G06F 40/174 707/769 |
| 2010/0299389 | A1 * | 11/2010 | Boyer | G06F 40/151 709/203 |
| 2011/0093406 | A1 * | 4/2011 | Angel | G06Q 10/067 705/348 |
| 2011/0184870 | A1 * | 7/2011 | Angel | G06F 8/34 705/301 |
| 2011/0185315 | A1 * | 7/2011 | Armour | G06F 8/34 715/853 |
| 2012/0136756 | A1 * | 5/2012 | Jitkoff | G06Q 30/0641 705/27.1 |
| 2012/0233532 | A1 * | 9/2012 | Rickabaugh | G06F 17/2247 715/209 |
| 2013/0097479 | A1 * | 4/2013 | Zavaleta | G06F 17/243 715/222 |
| 2013/0097480 | A1 | 4/2013 | Allison et al. | |
| 2013/0152041 | A1 * | 6/2013 | Hatfield | G06F 8/34 717/105 |
| 2013/0179761 | A1 * | 7/2013 | Cho | G06F 17/2235 715/202 |
| 2014/0075413 | A1 | 3/2014 | Binjrajka | |
| 2015/0039989 | A1 * | 2/2015 | Dhanawat | G06F 3/017 715/226 |
| 2015/0178861 | A1 * | 6/2015 | Gordon | G06Q 50/08 705/301 |
| 2015/0350437 | A1 * | 12/2015 | Vymenets | H04M 3/5166 379/265.03 |
| 2016/0124929 | A1 * | 5/2016 | Kharbanda | G06F 17/243 715/223 |
| 2016/0124931 | A1 * | 5/2016 | Fan | G06F 3/0481 715/224 |

(56) References Cited

U.S. PATENT DOCUMENTS

2017/0228356 A1* 8/2017 Kee .................. G06F 16/93
2018/0225266 A1* 8/2018 White ................ G06Q 10/10
2018/0225273 A1* 8/2018 White ................ G06Q 10/10

OTHER PUBLICATIONS

PCT International Search Report and Written Opinion, PCT/AU2016/050676, Sep. 8, 2016, 9 Pages.

* cited by examiner

SYSTEMS AND METHODS FOR EXECUTABLE CONTENT AND EXECUTABLE CONTENT FLOW CREATION

CROSS-REFERENCE TO RELATED APPLICATIONS

The present application claims priority from Australian Provisional Application No 2015903059 filed on 31 Jul. 2015, the contents of which are incorporated herein by reference.

The present application also claims priority from Australian Application No 2015224516 filed on 11 Sep. 2015, the contents of which are incorporated herein by reference.

The present application also claims priority from. Australian Application No 2015224517 filed on 11 Sep. 2015, the contents of which are incorporated herein by reference.

TECHNICAL FIELD

Disclosed are systems and methods for executable content creation and executable content flow creation.

BACKGROUND content, and in particular forms, are designed by a business analyst or designer and then coded by a programmer. Particularly in the case of systems and methods that require user interaction and input, the content displayed and the sequence, or flow of the content, is typically pre-programmed by vendors or suppliers. To suit a customer's needs and requirements, customized modifications are often made by the supplier or vendor, as they typically require some modification of the underlying system programming code. Further, since the systems are often proprietary, customers or users are usually prevented from modifying the content or flow, with the exception of a few rudimentary and often cursory settings.

While some systems allow a user to modify or create content, these changes are typically limited to changing how the content is displayed, such as content text and positioning. Further, while content can be lightly customized by a user, the content flow usually cannot be customized at all. That is, the system is pre-programmed to display content in a certain order or sequence. The order can change based on a user's input, but these changed orders are also pre-programmed into the overall system.

The use of pre-programmed systems, which requires customization for individual users and customers, not only limits the scope of the system, but also limits its lifespan. For example, when regulations change, content, and in particular forms may need updates. When system updates are required, a customer or user must request or receive a system update from the supplier. The system updates take time to create and must also be customized to work within existing customized systems. The updated and customized work leads to lengthy delays before the system is updated. Due to the difficulty of customizing such systems and the lengthy updating process, user or customer costs can be relatively higher than the base system price for the system depending on the amount of customization desired.

Enterprise-type software systems are purpose-designed software used to satisfy the needs of an organization rather than the individual. For example, an enterprise-type software system can use forms that conform to current regulations or standards. A form may include one or more form items which is a display screen item within a product that allows for data entry and data management. When these regulations or standards are updated, the current forms usually becomes obsolete, which requires either creating a new version of the form or the creation of additional forms to fill the regulatory gap between the existing form and the new regulations. Alternatively an updated, new version of the form may be created but it must be programmed to exist and function across multiple platforms, often on a platform-by-platform basis. Therefore, the timeframe and expense of updating forms are increased.

SUMMARY

There exists a need for executable content and content flow creation systems and methods, and more particularly executable form and form flow creation systems and methods that can allow a user to build, customize and change an executable form or other executable content. Executable means the input or interaction, either of a user or remote input, either pulled or pushed can cause an output to occur. An example of executable content is an executable form item that represents form logic. For example, when a form item field is filled in by a user or other means, data is delivered to a server as output. Other examples can include selecting an option where when selected, an output occurs such as a user's choice is provided to a server. Multiple executions can occur. For example data can be saved to a server, and another executable form item can be displayed or the path through subsequent content to be followed is delivered. The particular output that occurs as a result of the execution can include any type of output. For example, input or interaction with executable content can lead to generation or display of unexecutable content such as an alert.

During the creation of an executable form, there is a need to be able to view the form as it would present on various form factors. Moreover, there is a need to allow a user to arrange a plurality of forms in an order or form flow. A form flow on a display can resemble a flow chart so that as the forms are being used, they can execute in a particular order depending upon the responses to form items of the forms of the form flow as well as based on other external factors (such as the country of operation, or the month of the year etc). In this way, a user can build reusable forms and readily update the forms and utilize them in one or more processes. A distinction is made between indicia representative of a form item and an executable form item. The indicia is available for selection by a user to become an executable form item in a form. Similarly, flow control indicia is available for selection by a user to become a flow control within a form flow.

Disclosed are methods and systems that allows a user to access indicia representing executable form items, click and drag them into a space on a display screen, and build a form of executable form items. The disclosed methods and systems allow the executable form items to be arranged and rearranged as the user is building the form. The form as it is being built on a display is executable as execution codes are attached the form items when the indicia is dragged onto a form view screen. The form can then become part of a form flow, that is a flow chart, that indicates controls such as 'then', 'else if', 'goto', 'jump', 'while'. Because the form items become executable when displayed in, for example, a form viewer, a user will not need to consider how to define the manner in which the form items function. That is a user, in a single step, will select a form item that is a particular type to the build the form, and this form will immediately be executable.

Disclosed are methods and systems that allows a user to access indicia representing executable form items, click and drag them into a space on a display screen, and build a form of executable form items. The disclosed methods and systems allow the executable form items to be arranged and rearranged as the user is building the form. One or more forms may become part of a form flow process file having a flow control. Disclosed is providing multiple flow indicia representative of flow controls and graphical representations of at least one executable form and receiving instructions that include a selection of one or more flow indicia representative of flow controls related to the at least one form. A form flow diagram may be provide on a graphical user interface including an arrangement of at least one executable form and a flow control. Upon selection, the flow control can be invoked.

Disclosed are methods and systems for enabling customizable executable content and customizable executable content flows. More specifically, disclosed are methods and systems for enabling customizable forms, such as executable forms, and form flows, such as form flows that include executable forms. More particularly, methods of creating executable forms are disclosed in which form indicia representing of a plurality of executable form items are provided on a display screen. The form items are represented by indicia. Instructions are received to select a first form indicium from the form indicia and the first form indicium is selected. The selected first form indicium is then displayed and further instructions are received to select a second form indicium of the form indicia. The second form indicium is selected. The selected first form indicium and the second form indicium are displayed in a particular order as an executable form that has executable form items.

In an example, the executable form items are then executed. In still further examples, the receiving the instruction to select a first indicium and a second indicium can be done via a latching device that can latch onto the indicia on a screen of the display and move the indicia to another location on the display screen or another display screen. Further, some example methods also change the particular order of the selected first indicium and the selected second indicium so that the executable form items are in another particular order. In some of the examples, the indicia representative of the plurality of executable form items on a display screen are divided into categories of executable form items.

Also disclosed are methods of creating executable forms in which form indicia representative of a plurality of executable form items are provided on a display screen and instructions to select a first indicium of the form indicia are received. The first form indicium is selected and the selected first form indicium is displayed. Instructions are received to select a second form indicium of the form indicia and the second form indicium is selected. The selected second form indicium with the selected first form indicium is displayed in a particular order as a first executable form that has executable form items. These steps are repeated to generate a second executable form, and optionally additional executable forms, and the second executable form is also displayed.

Disclosed are also methods of creating a form flow process based on the forms, and in some examples the executable forms, discussed above. Flow indicia representative of flow controls are provided on the display screen or any other display screen. Instructions are received to select a first flow indicium of the flow indicia. The first flow indicium when positioned on a form flow viewer or display invokes a selected flow control. Instructions are received for arranging one or both of a first executable form and a second executable form in conjunction with the invoked selected flow control on the display screen or another display screen. A form flow diagram is displayed on the display screen or another display screen. The form flow diagram includes the first executable form and the second executable form in conjunction with the invoked selected flow control.

Also disclosed are methods of creating customizable forms that include transmitting from a server to a designer device multiple form items indicia. The server receives first instructions from the designer device. The first instructions include a selection of at least one of the multiple form items indicia. An executable form is generated that includes the selected at least one of the multiple form items indicia as form items. The executable form can be stored in a form database, in some examples. The executable form can be sent to one or both of the designer device and a user device. In some examples, the instructions include a selection of at least two of the multiple executable form items indicia and the server receives second instructions from the designer device. The second instructions include an order of the selected at least two of the multiple executable form items. In some examples, the first instructions and the second instructions are simultaneously sent as a combined instruction to the server. The server can also receive third instructions from the designer device. The third instructions could include a revision, addition, and/or deletion of at least one of the selection of the at least two of the multiple executable form items and the order of the selected at least two of the multiple executable form items.

In some of the example methods of creating customizable forms, more than one customizable form is created. The multiple customizable forms can be stored in a forms database. Corresponding systems with system components that function in the same way as the described methods are also disclosed.

Still other example methods of creating customizable forms are disclosed. These methods include a designer device sending a request to create a customizable form to a server and receiving, from the server, a data message that includes multiple form items indicia. The multiple form items indicia are displayed on a display of the designer device. The designer device receives first user input that includes a selection of at least one of the multiple form items indicia. A data message that includes the selected at least one of the multiple form items indicia is transmitted to the server. An executable form is received that includes the executable code of each of the selected at least one of the multiple form items indicia. In some examples, the received executable form is displayed on the display of the designed device. Still further, in some examples the displaying on the display of the designer device the multiple form items indicia includes displaying groups of the multiple form items indicia categorized by type of form items indicia. The received executable form can be executed on the designer device in some example methods.

The designer device can, in some examples, receive second user input that includes revision, addition, and/or deletion of the selection of the multiple form items on the display or form viewer. The first user input includes selection of at least two multiple executable form items and second user input can be received at the designer device, in some examples. The second user input includes a revision, addition, and/or deletion of at least one of the selection of the multiple executable form items and an order of the selection of the multiple executable form items. As with the other examples above, the disclosed methods of creating the customizable form can be repeated to create multiple executable forms.

Still additional methods of creating customizable forms are disclosed. A server transmits multiple form items indicia to a designer device. Each of the multiple form items indicia represent corresponding executable form items. The server receives first instructions from the designer device that include a selection of at least one of the multiple form items indicia. An executable form is generated that includes the form items corresponding to each of the selected at least one of the multiple executable form items indicia.

Systems for creating customizable forms are also disclosed and include an form items indicia database, a server, and a processor. The form items indicia database is configured to store multiple form items indicia each representative of corresponding executable form items. The server is configured to transmit at least some portion of the multiple form items indicia to a designer device and is further configured to receive first instructions from the designer device that include a selection of at least one of the multiple form items indicia. The processor is configured to generate an executable form that includes the executable form items of each of the selected at least one of the multiple form items indicia. The server can be configured, in some examples, to transmit the at least some portion of the multiple form items after receiving a request for the at least some portion of the multiple form items from the designer device.

In the example systems in which the instruction includes the selection of at least two multiple form items indicia the server can be configured to receive second instructions from the designer device that includes a revision, addition, and/or deletion of at least one of the selection of the at least two of the multiple form items indicia and the order of the selected at least two of the multiple executable form items on the form viewer. The server can be configured to transmit the executable form to the designer device and in further examples can transmit the executable form to the design device after receiving a request for the executable form from the designer device.

Also disclosed are systems in which the executable form is a first executable form and the server is further configured to receive second instructions from the designer device. The second instructions include a second selection of at least one of the multiple form items indicia. The processor is further configured to generate a second executable form that includes the executable controls relating to of each of the selected at least one of the multiple form items indicia for the second executable form. The system can also include an executable forms database that is configured to store the generated executable form. Still further, upon receiving a request from the designer device for the generated executable form, the server can be further configured to transmit the generated executable form to the designer device. The system can also include an executable forms database that is configured to store the first executable form and the second executable form. In still further examples, upon receiving a request from the designer device for the one or both of the first executable form and the second executable form, the server is further configured to transmit the one or both of the generated first executable form and the second executable form.

Also disclosed are methods for creating form flow processes. A first form and a second form are displayed on a display and flow indicia of flow controls are also provided on the display. Instructions are received to select a first flow control indicium of the flow indicia and to display the first form and the second form. The selected flow control is invoked in conjunction with the displayed first form and the displayed second form. A first form flow diagram is displayed on the display screen or another display. The first form flow diagram includes an arrangement of the first form and the second form in conjunction with the invoked selected flow control. In further examples, instructions can be received to rearrange at least one of a first form and a second form in conjunction with a selected flow control on the display screen and a second form flow diagram can be displayed on the display screen or any other display screen. The second form flow diagram can include the first executable form and the second executable form. Any of these forms in the form flow creation process can be executable.

Disclosed are methods for creating form flow processes that include transmitting multiple flow indicia of flow controls related to at least one form and a graphical representation of at least one form to a designer device. Instructions from the designer device are received and include a selection of at least a first flow control indicium related to the at least one form. The first flow control indicium is invoked and related to the at least one form in conjunction with the at least one form to create a first form flow diagram that includes an arrangement of the at least one form and the at least the first flow control indicium. The first form flow diagram can be transmitted to the designer device. Upon receiving a request for the at least one form based on the first form flow diagram from the designer device, the at least one form can be transmitted to the designer device.

In some examples, the at least one form includes a first form and a second form and, upon receiving a first request for the first form based on the first form flow diagram, the first form is transmitted to the designer device. Upon receiving a second request for the second form based on the first form flow diagram, transmitting the second form to the designer device. As with the above examples, the forms can be executable forms.

Still additional methods of creating form flow processes are disclosed and include providing multiple flow indicia of flow controls and graphical representations of at least one form and receiving instructions that include a selection of one or more flow indicia of flow controls related to the at least one form. The received instructions are transmitted to a server and a form flow diagram is received based on the transmitted instructions. The form flow diagram includes an arrangement of the at least one form. In some examples, a request for the at least one form is transmitted based on the received form flow diagram. The multiple forms can include a first form and a second form. In some examples, one or more flow indicia of flow controls related to the first form and the second form are selected and the form flow diagram includes an arrangement of the first form and the second form.

A request for the first, form transmitted based on the form flow diagram. If desired, a request for the second form is also transmitted based on the form flow diagram. Any of these forms can be executable. The multiple flow indicia of flow controls and graphical representations of at least one form are displayed on a display of the designer device. The form flow diagram can also be displayed on a display of the designer device. Instructions are received to rearrange at least one of the one or more flow indicia of flow controls and the at least one form, in some examples, and can include one or more conditional if/then/else logic. Also disclosed are offline operations modes for the disclosed form flow processes. An offline message is transmitted and, in response to the transmission of the offline message, the form flow diagram is received along with each of the at least one forms related to the form flow diagram.)

Disclosed are methods of creating a form flow process in which the instructions are transmitted from a designer device. A data message is transmitted that includes a form factor of the designer device to the server. The form factor can include a mobile form factor, a tablet form factor, and a desktop/laptop form factor. The form flow diagram can be received in a computing language that is compatible with the form factor of the designer device.

Other disclosed methods of using form flow processes include receiving a request from a user device at a server for a first form flow. The first form flow includes a process of first form flow controls. Each of the form flow controls is related to at least one form stored in a forms database. The first form flow is transmitted to the user device. The server receives a first request from the user device for a first form indicated in the first form flow control. The server also receives a data transmission from the user device that includes a form factor of the user device. The first form is transmitted to the user device in the form factor of the user device.

The disclosed methods of using form flow processes also can include receiving a second request from the user device for a second form indicated in the first form flow control and transmitting the second form to the user device. The second form is transmitted in a computing language that is compatible with the form factor of the user device. The first form flow can be stored in a form flows database and can be executable. The form factor can include a mobile form factor, a tablet form factor, and a desktop/laptop form factor. The first request and the data transmission are received simultaneously by the server, in some examples.

Also disclosed are systems of using a form flow process that have a server and a processor. The server is configured to receive a form factor data transmission from one of a designer device and a user device. The form factor data transmission can include a form factor associated with the one of the designer device and the user device. The server is also configured to receive requests from the designer device for multiple flow indicia of flow controls and graphical representations of at least one form from the multiple forms stored in the forms database and to receive instructions that include a selection of one or more flow indicia of flow controls related to the at least one form. Still further, the server is configured to transmit a form flow diagram based on the received instructions. The form flow diagram includes an arrangement of the at least one form based on the selected one or more flow indicia of flow controls. The processor is configured to invoke the selection of one or more flow indicia of the flow controls related to the at least one form in conjunction with the at least one form to create the first form flow diagram that includes an arrangement of the at least one form and the selected flow indicia.

Disclosed are freight management systems, comprising: a forms database configured to store multiple executable forms, each of the stored executable forms including one or more executable form items indicia selected by a user from multiple form items indicia representative of corresponding form items, the multiple form items indicia displayed on a user device; a form flow process database configured to store multiple form flow processes, each of the stored form flow processes including respective form flow controls that each invoke a selected flow control associated when with one or more of the forms stored in the forms database; and a freight management module configured, upon request from a user device, to invoke at least one form flow process and at least one of the forms.

DESCRIPTION OF EMBODIMENTS

The disclosed systems and methods enable creating executable content and content flows without programming. For example, executable content can include interactive content. In one embodiment, content is forms, and content flows is form flows. In this disclosure, executable content will refer to executable forms. Nothing in this discussion is intended to limit content to forms however, the forms embodiment provide a ready illustration of the disclosed systems and methods.

The disclosed systems and methods enable the creation of executable form and form flows and, for example, can use the relationships between a central server, a designer device, and a user device to create, store, and transmit the created content and content flows in a lean computing environment. The created forms and form flows are useful in any environment, business lines, or systems in which a form is used. Generally, the disclosed systems and method provide visual layouts that represent form logic so users can visually or graphically create the form and form flow without needing to code computing language to create the form or form flow.

Logistics of transporting goods and freight is an example of an industry that requires many forms because is it a highly regulated global industry. When regulations change, forms and form flows often need to change. The disclosed example forms and forms flow systems and methods can function in a freight logistics environment. One of skill in the art will appreciate that the forms and form flows methods and systems disclosed here could be applied in any environment or system that uses or requires a form and even more broadly, the disclosed systems and method can apply anywhere that executable content and content flows are used.

Figure 1:
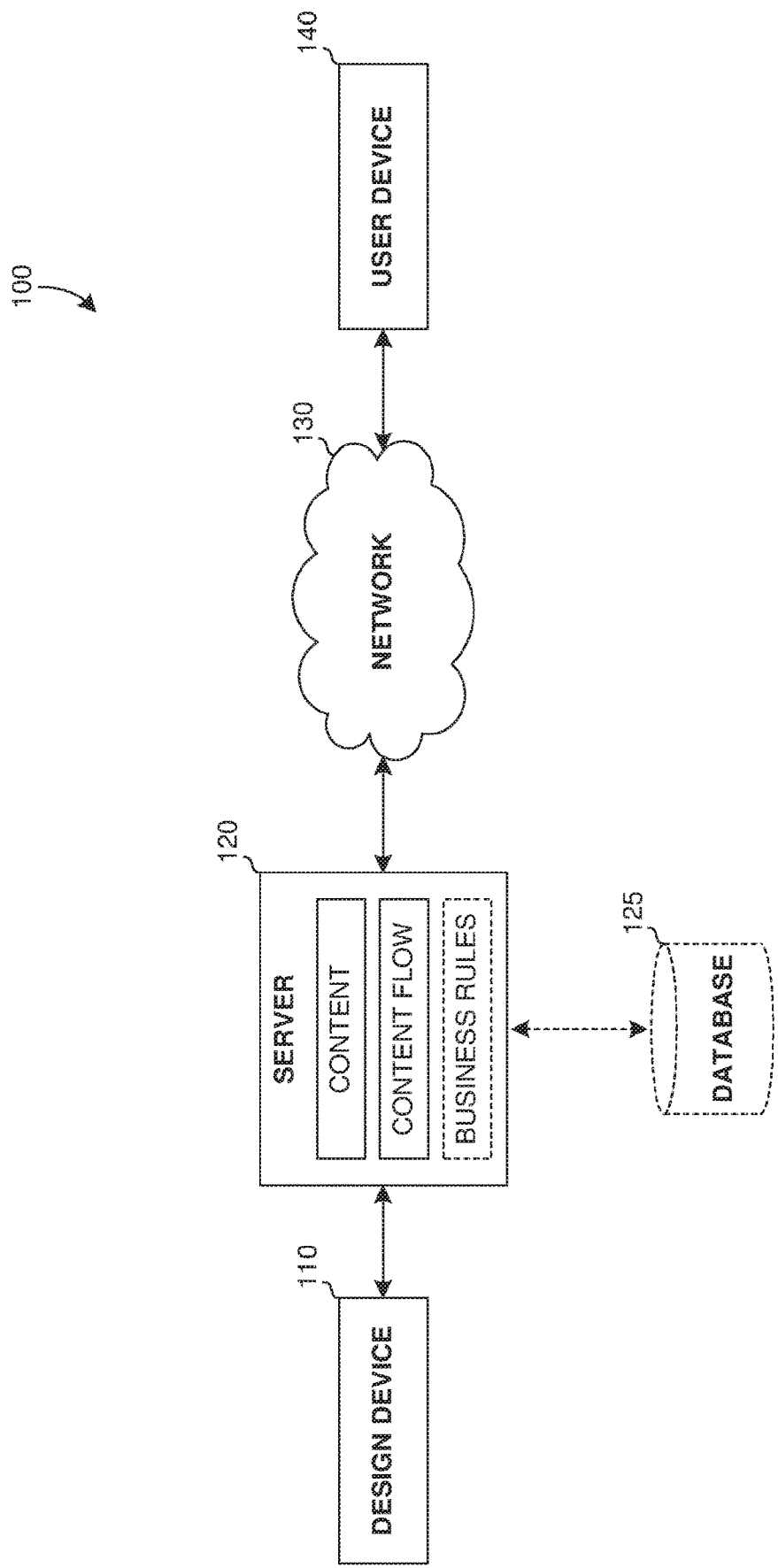
FIG. 1 is an example content and content flow system.

As mentioned, the described executable content can be of various types, including interactive content that can require user input, of which forms are a type of executable content. More particularly, this discussion will focus on executable forms as the executable content. FIG. 1 is an example of an executable form and form flow creation system 100. Forms can be designed on a design device 110 and stored on a server 120. Any other system configuration that provides the functionality to carry out the disclosed methods are within the scope of this discussion. The design device 110 is also used to create the form flow, which is also stored on the server 120. As mentioned, the form flow is the order in which various forms are accessed during a user device 140 requested process execution. The form flow is the logic underlying the display of form items to a user based on a user's interaction with the forms in the form flow.

Ultimately when the process of form and form flow creation is complete, during execution of the form flow on the user device 140, the form flow is retrieved from the server as required by the user. The forms of the form flow are delivered as the forms are required during execution of the form flow on the user device. If server/network access is limited, forms can be stored on the user device 140. Both the forms and the form flow(s) can be stored on the same server 120 as shown in FIG. 1, or alternatively, could be stored separately from one another as could be done in a distributed system such as a cloud-based computing system. Since the form and the form flows exist separately, there is not a requirement that the two be stored on the same server or system.

As form flow determines a sequence, order and/or arrangement or other configuration of displayed related forms, form flow can be visualized as a flow chart. The form flow can include flow elements such as "if" conditions, switch conditions, while loops, jump/goto statements, decision statements, confirmation messages and other flow elements. The form flow defines a logical pathway by which one or more the related forms is accessed. Responses or rules regarding user inputs and interactions can be included in the form flow to be used to determine the subsequent content to retrieve and/or display. User input or interaction may not be required in the form flow in certain situations, such described above. The input and interaction can include the retrieval of information from a user device, a database, an intranet or the Internet. Such input can include, for example, OPS data or ambient sensor readings.

A design or designer device 110 can be used to create a form and form flow which can be stored on a server 120 for use by a user device 140. Any other configuration of a design device is within the scope of this discussion. For example, a design device can be more than one device, for example, where multiple parties are contributing to the content of content flow.

Figure 2:
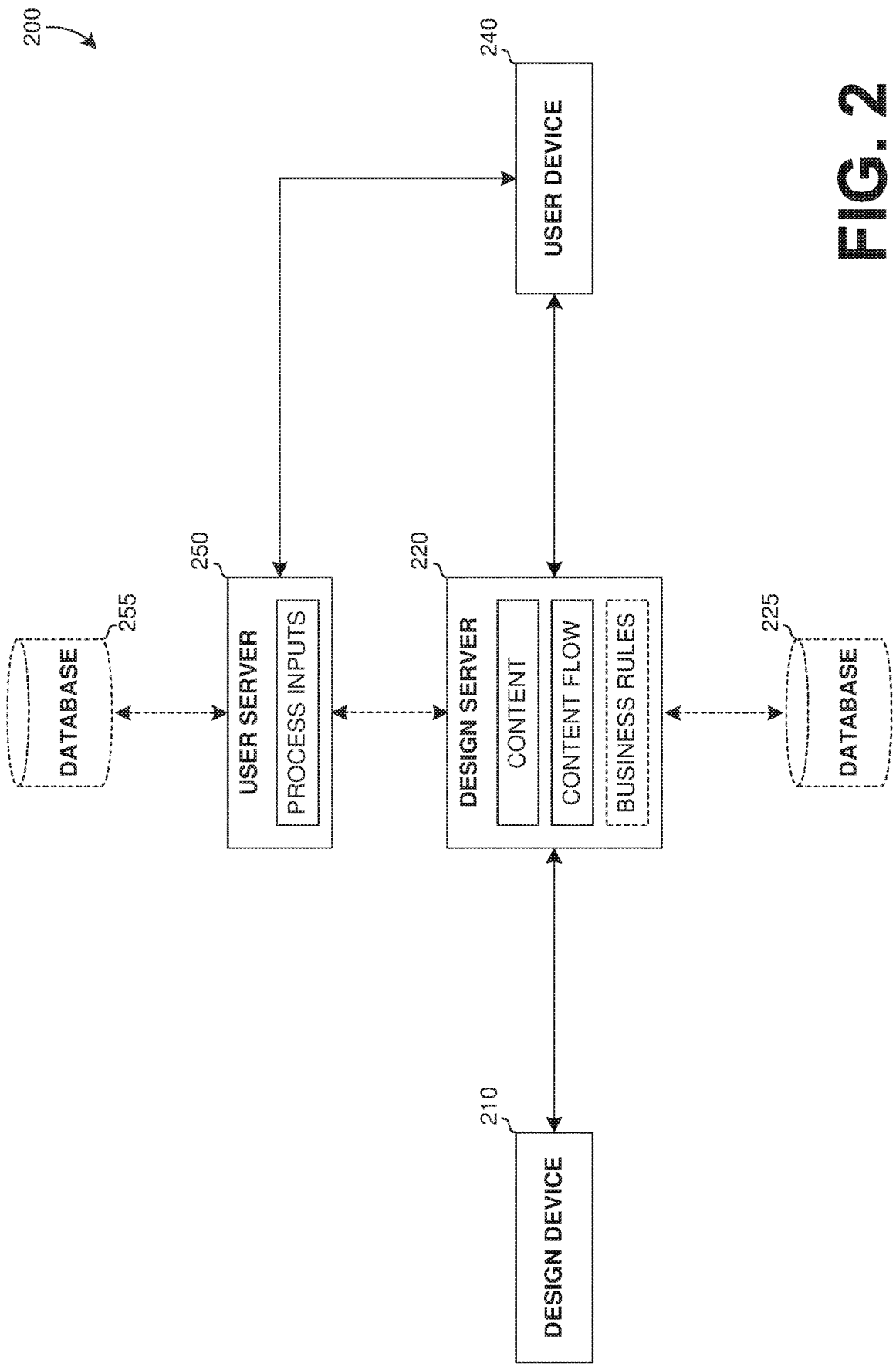
FIG. 2 is another example content and content flow system.

FIG. 2 is another example form and form flow system 200. In this example, the user process inputs can be transmitted by the user device 240 to a user server 250. The user server 250 can communicate with a database 255 where the process inputs can be stored and/or other information is stored. Process inputs would include the data that is inserted into a field, pulled or pushed. For example, were the field for "Booking Party" the process input could be "Joe's BBQ" (see FIG. 4, item 421). If the field were for "Transport Company" the process input could be "Frank's Freight". The user server 250 can receive the process inputs and compare or process them using information or tools stored on the connected database 255.

To illustrate the many system variations, FIG. 2 shows the design server 220 and the optional database 225 which can be similar in nature and function to the server 120 and database 125 of FIG. 1. In the example shown in FIG. 2, the user device transmits content inputs to a user server 250, so the design server 220 can function as purely a design server, containing the content, content flow, business rules and other content related items the user device may require to complete a selected task.

In the form and form flow system 200 of FIG. 2, the design device 210 is used to create form and form flows which are stored on a design server 220. The user device 240 can request a process from the design server 220 and will receive form and form flow. The design server 220 can also include business rules. A database 225 can also communicate with the design server 220. The database 225 can include other executable content, business rules or other information. The various elements of the form and form flow system 200 of FIG. 2 or any other system configuration can communicate between each other using network or other electronic communication protocols or methods.

Figure 3:
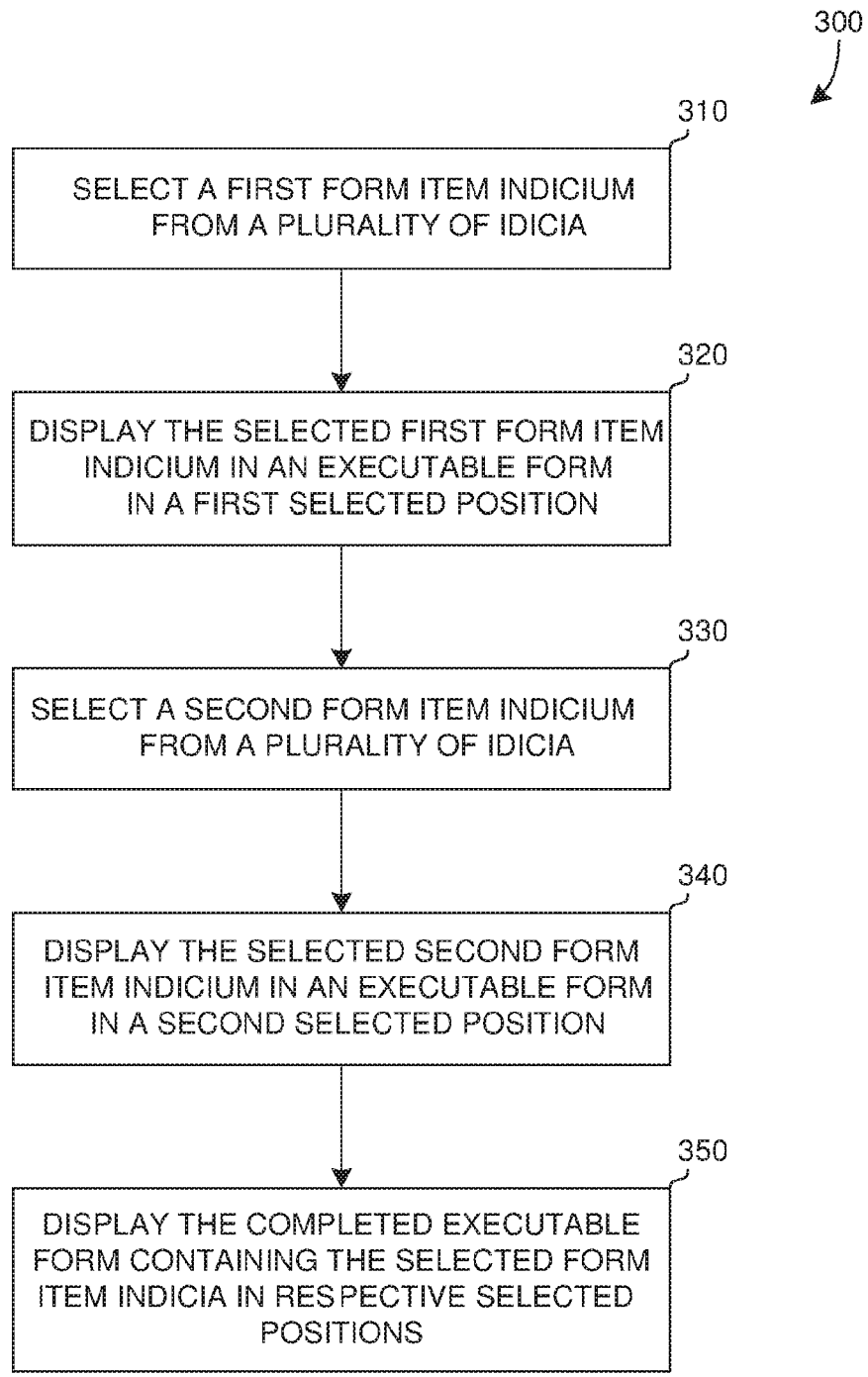
FIG. 3 is an example form creation process.

FIG. 3 depicts a form creation process 300. A form designer selects a first form indicium from a provided list, or plurality, of form indicia 310. A form indicium (pl, indicia) can be a form element, such as an input box or other interactive content. The first form indicium is placed and positioned by the designer 320 in the form view 420 (see FIG. 4) of the designer device or other suitable system. For example, the indicium is dragged from a list into the form view. When, for example the indicium is clicked, dragged or placed, the system inserts a code making the form item executable in the form. Other actions other than clicking, dragging or placing may cause the code to be linked or bound to the selected form item. Any other manner of positioning form items for inclusion in a form is within the scope of this discussion, particularly those utilized in a user graphical interface. The click and drag method described here is a common user interface method. A second form indicium can be selected 330 and placed and positioned within the form view 420. The process of selecting and placing a form indicium can be repeated until the desired indicia are included within the form view 420. Once the form in the form view is complete 350, the designer can view the completed form and the various indicia and their positions within the form view 420.

Figure 4:
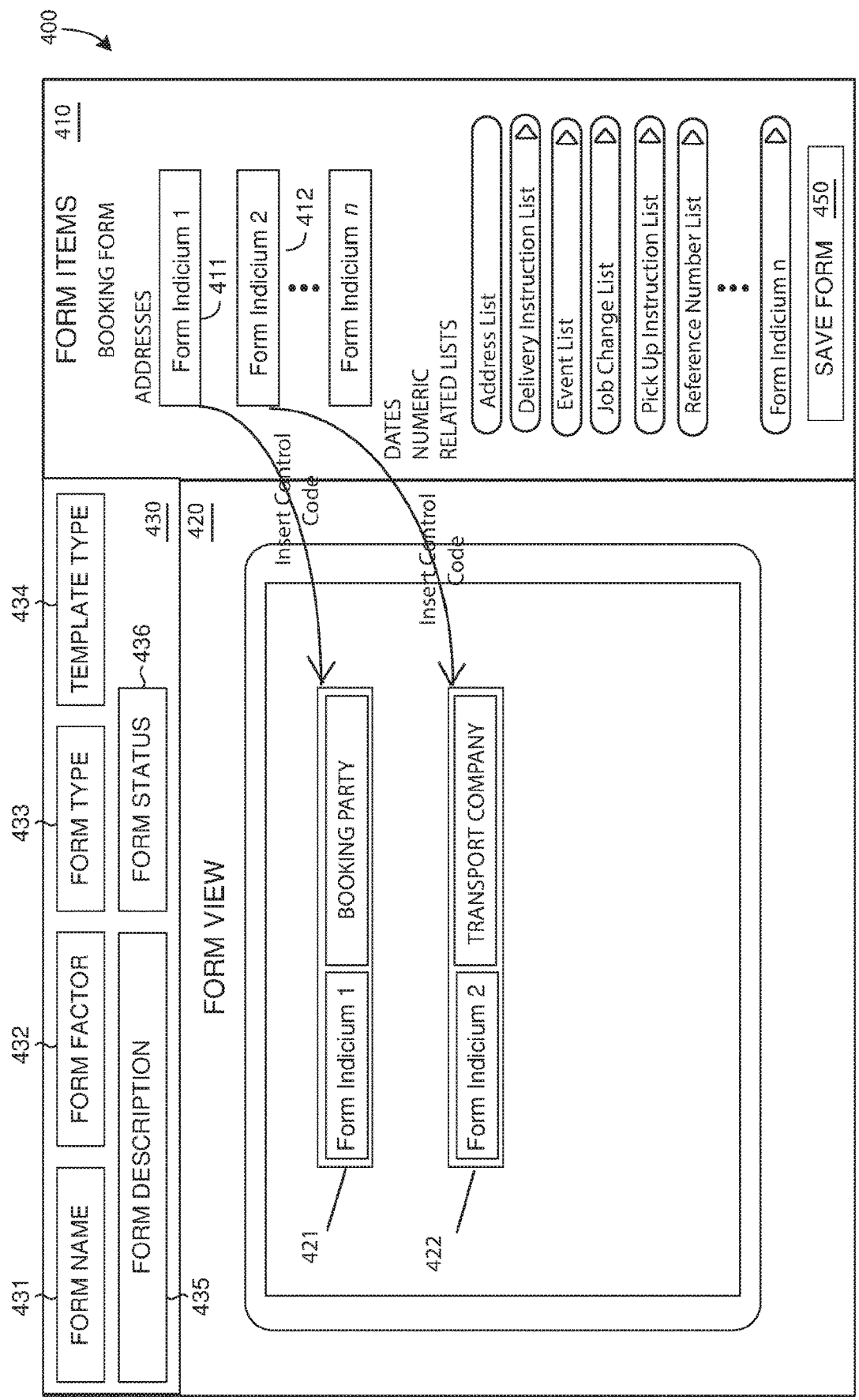
FIG. 4 is an example form creation interface where control code is inserted.
Figure 5:
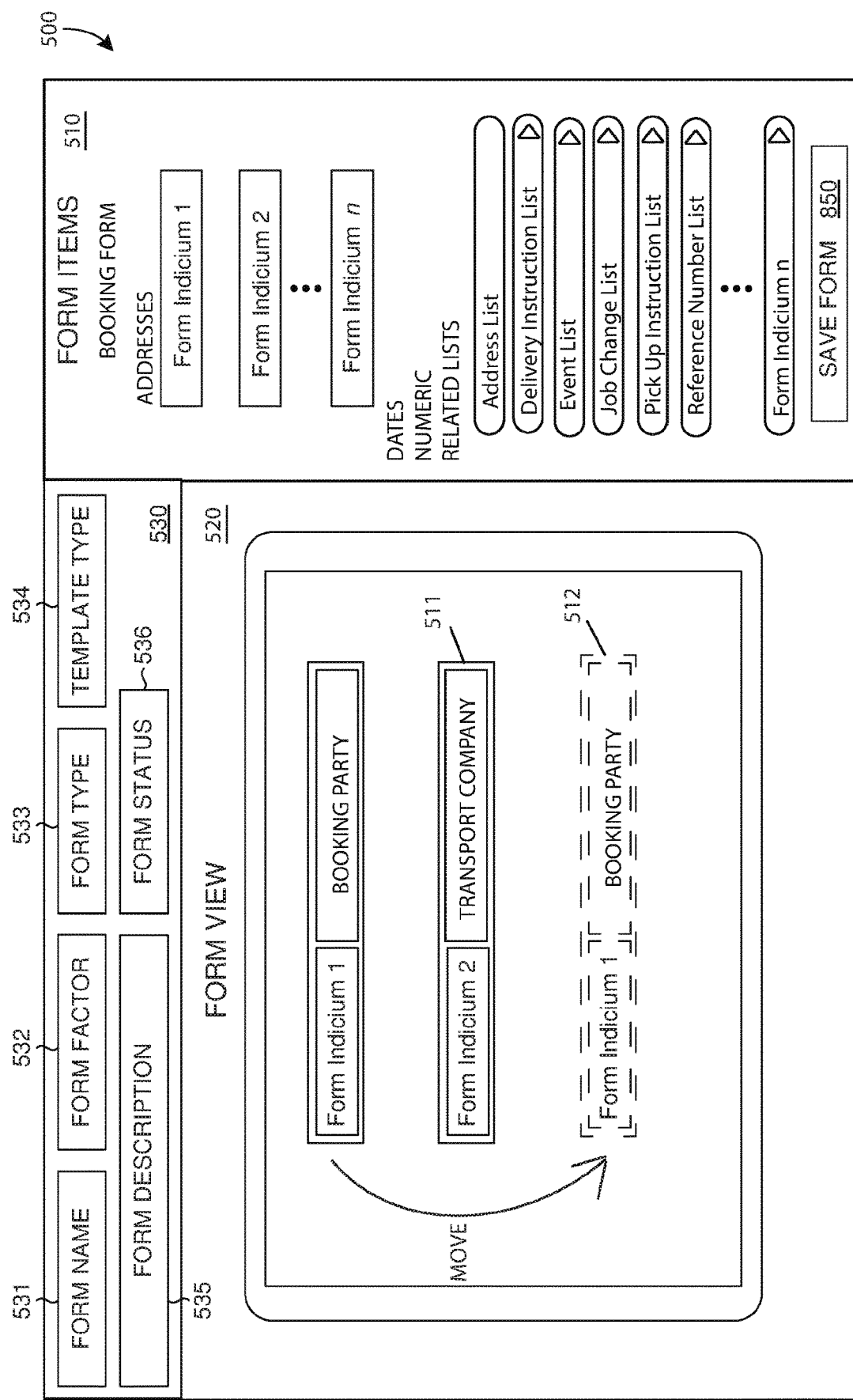
FIG. 5 is an example form creation interface utilizing form creation features.

Now referring to FIG. 4, when the user clicks, drags or places a field from the form item list 410 onto a form view 420, the system will do thing things: (1) the system will determine what type of control to drop onto the form view 420 by using the mapping table below; and (2) the system will insert XAML for that specific control into the form's XAML that specifies a) the type of control and b) the field that is being inserted/dragged into the form (city, state, postcode etc.). Upon completion of the form, the XAML is serialized, Serializing means converting what is dragged onto the form view 420 (see FIG. 4) into a structure that can be stored in the database as text (XAML). Deserializing means reading that XAML from the database and reconstructing the form either for further designer modifications, or for preparation for execution.

| Mapping Table | |
|---|---|
| Data Type | Type of Control |
| String | Text box |
| String with list of choices | Dropdown |
| Date | Date picker |
| Time/Duration | Time picker |
| Boolean | Checkbox or Option button (in cases like this, the user has a choice) |
| Collection | Grid |
| Related entity | Search box |

As background, eXtensible Application Markup Language (XAML) is an XML based language used for defining user interfaces. Any other such language is within the scope of this discussion. Accordingly, when a form rendering engine reads the serialized form XAML it can determine how to interpret the executable form items to produce a form that can be executed. Below, this process and how to achieve it is explained. In this way, a user without concern about how the form item will function, in a single repeatable step, can build a form.

FIG. 4 depicts that as the disclosed systems and methods allow a user to drag fields from the form list 410 onto a form which is being created on the form view 420, the disclosed systems and methods will insert XAML that represents the relevant control into the form of a specific type which are 'linked' or bound to the dragged field. That is, the system recognize the data type and in the form view 420, inserts a control. Such a field is for example form indicium 1 and form indicium 2. When the user saves the form 450 serialization of all the controls into a single block of XAML will occur, and this block of XAML is saved to the database.

Converting what is dragged onto the form view 420 into a structure that can be stored in the database as text (XAML) requires creating a set of XAML extensions to control certain configurable options including, but not limited to, what caption to show for a field, whether it should be read only or allow input, whether a control that accepts the entry of an address should or should not show a 'country' field etc.

In this way, a user in one step arranges executable form items to generate an executable form. Due to 2(b) above (the field that is being inserted/dragged into the form (city, state, postcode etc.), the system determines what data to load from the data storage as forms in which users enter inputs or data that is captured and used elsewhere within the system, or what data to push to the data storage when the user enters it. Executable form items may not require user interaction. Rather, they can retrieve an input based on data stored or generated within a user device, such as a time stamp, a location or other user device data.

Another feature depicted in FIG. 4 refers to form factors. The form factor field 432 can be a list of selectable form factors which determine the user device display size, resolution and other parameters. The form factors define the area in which the designer can design the created form. Shown in FIG. 4 is a tablet form factor, however during the form building process, the form factor on the form view 420 can be changed to another form factor. Other form factors include a smartphone, computer screen or other common user device types. Selected form factors 432 can be used to determine the form view 420. Changing form factors can be achieved by a "form service" that provides conversion to the rendering in the required language—either in XAML, HTML or BON (or whichever rendering language is utilised by a "native" device having particular form factor). In particular, creating a set of XAML extension for rendering on each device type can require ensuring that the form look nearly identical when it was run compared to when it was 'designed'. As mentioned, in the form view 420, the form factor can be changed.

To provide a one-step solution for a user to create an executable form and a form flow that would operate on different native platforms involves creating the mapping of data type to control type, and making the controls intelligent enough to understand those data types and the slight differences between them, creating the ability to have snippets for each control type in three languages, allowing multiple options on each control type (such as Width, Height, ReadOnly, Caption, TextWrapping, etc.)—and making these options work across all three languages in a near-identical way, and ensuring a near-identical user experience for each of the three language versions of each snippet. Making the controls intelligent enough to understand the data types when they are clicked, dragged or dropped onto the form view involves creating a snippet per control, per language. Each snippet then has a series of 'placeholders' within it, such as ~Width~, ~Height~ etc. There is code behind each of the snippets, for each language, that dictate how each of those options is interpreted by the relevant language and platform.

Creating such a conversion set would require substantial careful work by a large team of programmers and then carrying out this large project required careful planning, exceptional productivity management and constant testing.

For each device, there is a form rendering engine. This engine knows how to render the form for the specific device. It either renders from XAML, HTML or JSON. First the client device requests the form from the form service. The form service converts the designed and stored XAML into the required language—either XAML, HTML or JSON. For each 'type of control' (textbox, date picker etc) there is a snippet of code that defines that control in each language—i.e. XAML, HTML and JSON. For example, when converting a XAML form to JSON, for example, each XAML control is replaced with the JSON equivalent. The result can be that a JSON form that looks nearly identical to the original designed XAML form.

Figure 6:
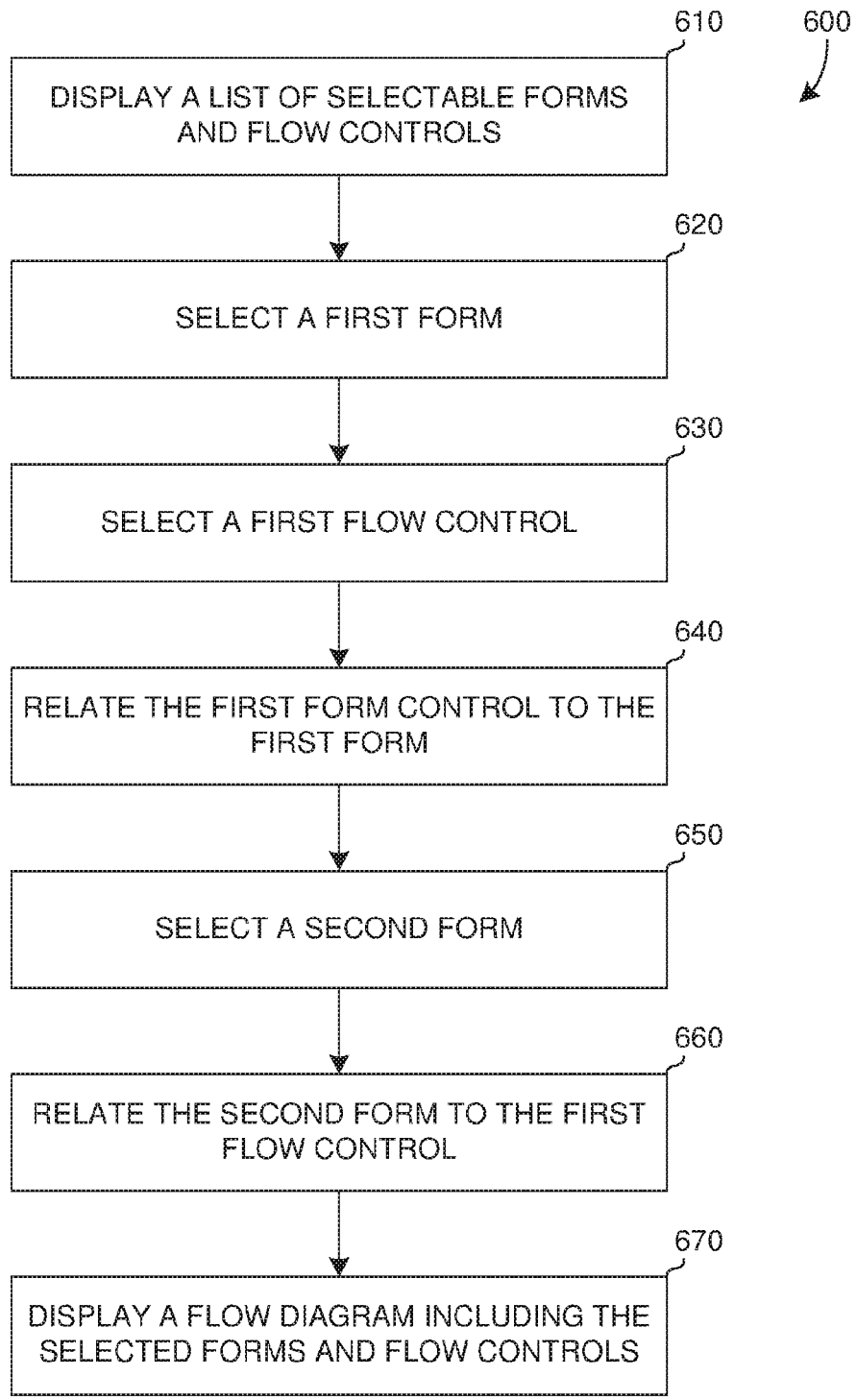
FIG. 6 is an example form creation process.

FIG. 6 depicts a process of the described form flow designer systems and methods. A list of selectable executable forms and flow controls are displayed 610 and a first form is selected from the list of forms 620. A first flow control is selected 630 and related to the first form 640. A second form can then be selected 650 and related to the first flow control 660. The completed form flow is displayed, showing the various selected forms and flow controls 670. When saved, the form flow is serialized and stored using XAML (however is not limited to XAML).

Figure 7:
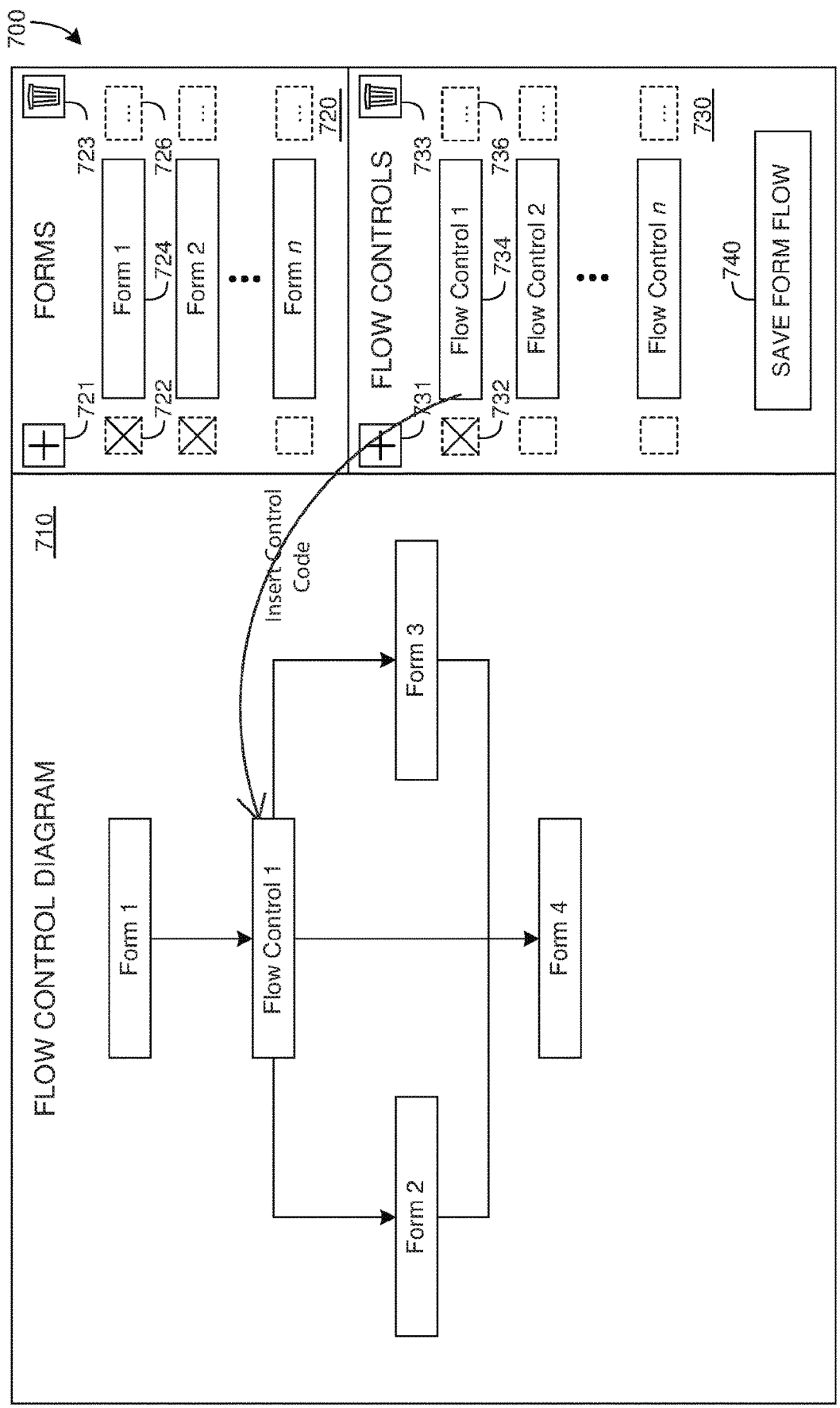
FIG. 7 is an example form flow creation interface.

FIG. 7 depicts a form flow designer. The form flow determines a sequence, order and/or arrangement or other configuration of a plurality of forms. The form flow can include flow elements such as "if" conditions, switch conditions, while loops, jump/goto statements, decision statements, confirmation messages and other flow elements. In an example flow, the form flow can function as logic statements that link various forms together in a variety of pathways and a user experiencing a singular pathway based on their interaction with the forms. In an example form flow, the form flow controls can function as logic statements that link various forms together in a variety of pathways, with a user experiencing a singular pathway based on their interaction with the forms. The form flow can result in non-singular flows as well where the user is given multiple choices.

The form flow code does not contain the code of the related forms. When requesting a process, the user device receives a form flow for that process. The form flow triggers the user device to request or retrieve selected forms based on the user's interaction with at least a previous form. If the user has limited server access, the form code can be stored on the user's device.

FIG. 7 shows that forms can be positioned on the graphical user interface. Just like with the form view interface, the forms in the flow designer can be moved into any order, copy and pasted, etc. The flow controls can be positioned between the forms, and can be moved to a different position as well. That is, when a flow control such as 734 is clicked, dragged or placed in the form flow designer user interface, code is inserted into the form flow. Edits can be made to the form flow since when the form flow is saved, the XAML code is serialized. Again, if changes after saving are desired, the XAML code will be deserialized and then later serialized.

Figure 8:
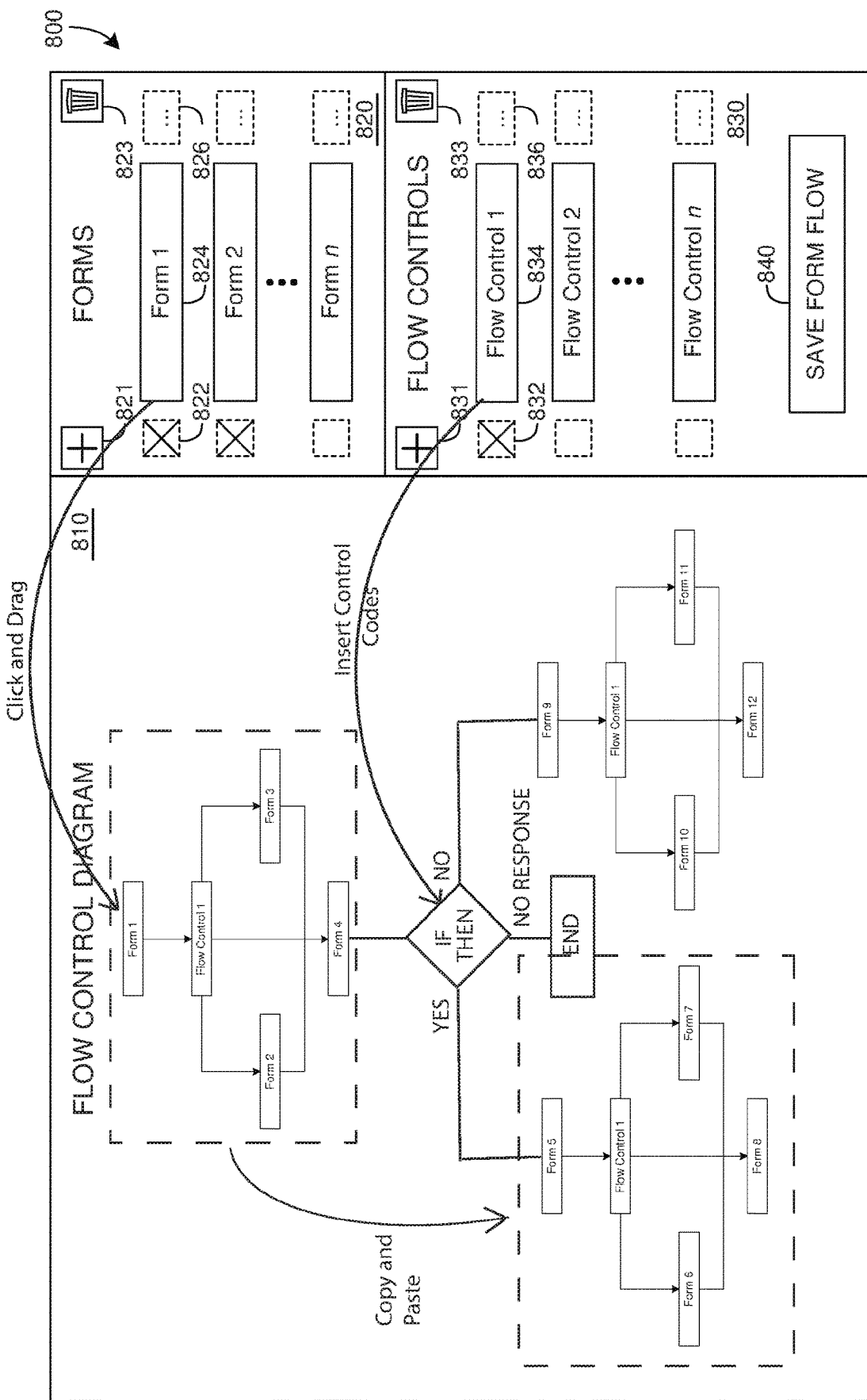
FIG. 8 is an example form flow creation process using the form flow creation features.

FIG. 8 is an example form flow creation process 800. A list of selectable forms and flow controls are displayed 810 and a first form is selected from the list of forms 820. A first flow control is selected 830 and related to the first form 840. A second form can then be selected 850 and related to the first flow control 860. The completed form flow is displayed, showing the various selected forms and flow controls 870.

Flow controls 834 are displayed in the flow controls window 830 and on the flow control diagram 810. The flow controls 834 are linked to associated forms as shown within the diagram 810. When the flow controls 834 are dragged to the flow form viewer, the flow controls are invoked which means that the form flow is executable. Similar to forms, when a user drags forms onto the form-flow designer, or flow elements (IF, WHILE, LOOP, JUMP, GOTO, etc.) these will be stored as serialized XAML in the form flow definition. The system will read the serialized form flow XAML and determine how to interpret each element in the form flow, and produce an executable system that follows the designed form-flow. As the form flow is executed, the form flow can call forms when certain form items are executed. Once the form flow is complete with the forms 824 and flow controls 834, the form flow can be saved or published to a server or other network location using the save form flow button 840.

Figure 9:
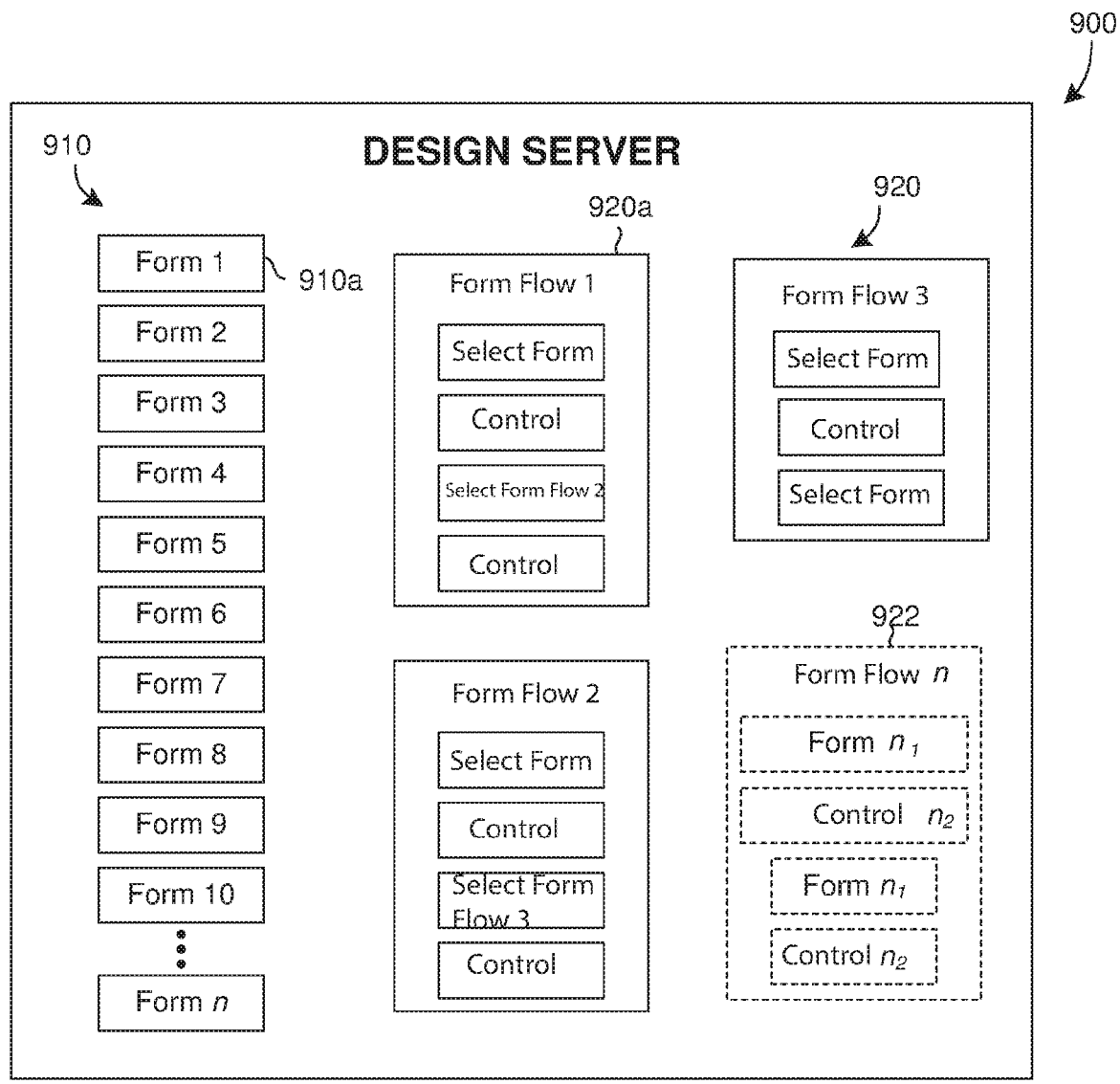
FIG. 9 is an example design server including example forms and form processes.

FIG. 9 is an example design server 900 that includes forms 910 and form flows 920. Business rules 930 can optionally be stored on the design server 900. As noted in FIGS. 1 and 2, the system configuration can include a plurality of remote servers. As discussed above, the forms 910 and the form flows 920 are stored separately from another within the server 900. Form flow 1 can select one or more forms from forms 910 and can select a different form flow, such as form flow 2. Various form flows can utilize the same forms. Form flow n is depicted to show that any form can be utilized within a form flow and control codes of the serialized XAML code link the forms so that the user can experience a seamless interaction with the forms.

Figure 10:
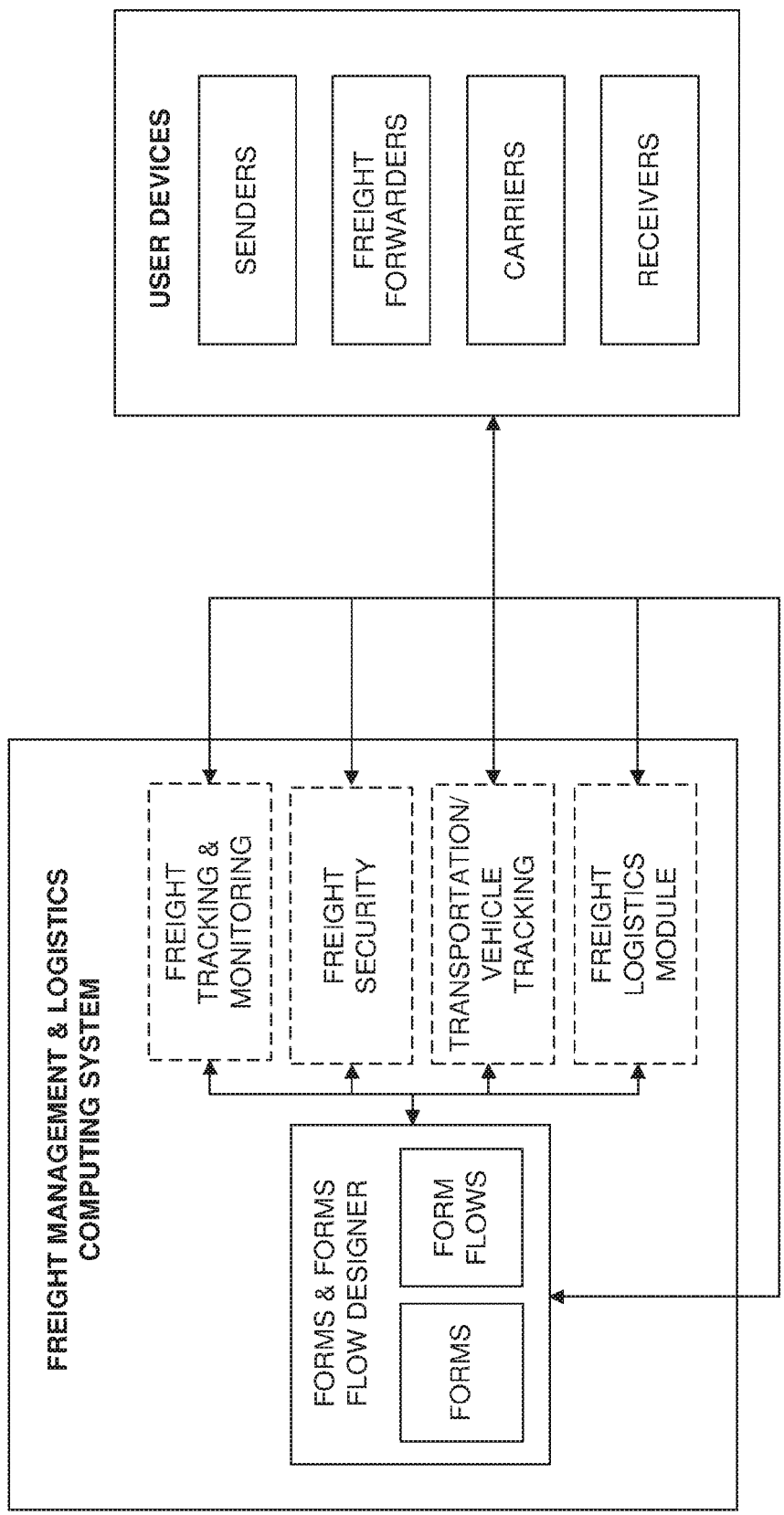
FIG. 10 is a use example of the disclosed systems and methods.

Referring to FIG. 10, many logistics systems, such as the proprietary WiseTech Global CargoWise One™ system, use a large number of forms to properly document and route cargo. Due to the international nature of the majority of cargo shipping, the forms can require frequent updates. Further, the integration of a logistics system with existing legacy systems can require unique customization of the logistics system for each customer. The use of the above described form creation and form control creation tools within a logistics system can allow customers or system suppliers to quickly and efficiently create and edit forms in response to regulatory changes. Further, the customizability of the forms and form controls can assist in the integration with existing or other customer systems. Customers can use the system supplied tool to create their own customized forms and flows.

The disclosed freight management system can include a freight forms database configured to store multiple executable freight forms each relating to an aspect of one or more freight shipments, each of the stored executable freight forms including one or more freight form items indicia selected by a user from multiple executable freight form items indicia representative of corresponding freight form items, the multiple executable freight form items indicia each displayed on a user device. The disclosed freight management system can also include a freight form flow process database configured to store multiple freight form flow processes, each of the stored freight form flow processes including respective freight form flow control that each invoke a selected freight flow control associated with one or more of the freight forms stored in the freight forms database. The disclosed freight management system can also include a freight management module configured, upon receiving a request from the user device, to receive at least one of the freight forms and the freight form flow processes and to transmit the received at least one of the freight forms and the freight form flow processes to the user device.

The disclosed freight management system can include a freight form database configured to store multiple executable freight forms, each of the stored executable freight forms including one or more freight form items indicia selected by a user from multiple freight form items indicia representative of corresponding freight form items, the stored freight forms each being executable and created based on instructions received from the user that include a selection of the one or more freight form items indicia. The disclosed freight management system can also include a freight form flow process database configured to store multiple freight form flow processes, each of the stored freight form flow processes including respective freight form flow control that when invoked provide a selected freight flow control associated with one or more of the freight forms stored in the freight forms database. Additionally it can include a freight tracking and monitoring module configured to access one or both of the freight forms database and the freight form flow process database, the freight tracking and monitoring module further configured to store and process data related to a first freight shipment, the freight shipment associated with one or both of a first freight form stored in the freight forms database and a first freight form flow process stored in the freight form flow process database, the freight tracking and monitoring module further configured to retrieve the first freight form from the freight forms database and the first freight form flow process from the freight form flow database.

A disclosed freight management system can include a freight form database configured to store multiple executable freight forms, each of the stored executable freight forms including one or more freight form items indicia selected by a user from multiple freight form items indicia representative of corresponding freight form items, the stored freight forms each being executable and created based on instructions received from the user that include a selection of the one or more freight form items indicia. It can also include a freight form flow process database configured to store multiple freight form flow processes, each of the stored freight form flow processes including respective freight form flow control that when invoked provide a selected freight flow control associated with one or more of the freight forms stored in the freight forms database. Furthermore, a disclosed freight management system can include a freight tracking and monitoring module configured to access one or both of the freight forms database and the freight form flow process database, the freight tracking and monitoring module further configured to store and process data related to a first freight shipment, the freight shipment associated with one or both of a first freight form stored in the freight forms database and a first freight form flow process stored in the freight form flow process database, the freight tracking and monitoring module further configured to retrieve the first freight form from the freight forms database and the first freight form flow process from the freight form flow database.

Example

In one example, the disclosed methods and systems are implemented as a platform that provides product managers and business analysts with a set of tools or building blocks that let them, i.e. non-technical people, build entire business products/applications. Further, they can build these products once, and deploy to multiple different software and hardware platforms, including iOS, Android, Windows Phone, Windows CE, Windows, Mac and Linux.

The major tools or building blocks are:
Form Designer
Form-Flow Designer
Form and Form-Flow Configurator
Business Rule Designer
Business Test Designer
This example will, for each of the above areas, explain:
The purpose of the tool
Definitions of relevant terms
The design of the tool
An example of usage of the tool Form Designer Form Designer allows a business analyst to create a form that is then used as part of a product. A form is built by business analysts dragging the relevant data elements onto the form's surface. A form can also be known as a page, a surface, a portal, a web site, a dashboard or a surface. A form contains either actions (menus, buttons, tiles) and/or data elements (text-boxes, drop-downs, date-controls, grids, lists) and/or visualisation elements (charts, graphs, dashboards).

When a business analyst creates a new form, they first nominate the data or record type that they are designing for. At this point, data elements are automatically discovered and shown based on the data type of the form. These data elements are categorised into data categories such as Date/Time fields, String fields, Numeric fields, Related Lists. Related Records and Images. A business analyst can then drag on the relevant data element. Further, a business analyst can also drag on other visual elements such as panels and group-boxes to allow for a logical layout of their form. Internally, for each type of data element or control (panel/group-box), the platform has a representation of the programming code/markup that allows this control to be rendered in multiple platforms

- eXtensible Application Markup Language (XAML) Windows Desktop Applications
- JavaScript Object Notation (JSON) for Windows CE
- HTML with KnockoutJS Binding for Web Browsers, iOS, Android and Windows Phone/Surface When multiple elements are dragged on to a surface, design server 220 creates an entire "file" that is the combination of those individual data elements and controls. Server 220 stores this file as part of the application as "data". This file is stored in a format that is platform neutral and represents the relevant information about the data element or control, including items such as:

The technical name of the data field that the element relates to
Layout settings including colours, margins, sizes and positions
Any control specific properties or options, such as whether a date control does or does not show the time element In other words, server 220 creates the forms in an intermediate language that can be transformed into device specific representation. When an individual device requests a specific form from the server, the server will understand what platform the client is using and convert, on the fly, the stored form representation into the correct representation (XAML, JSON or HTML with KnockoutJS) and deliver the converted form to the client. The client application can then render this form as it is in a natively understood format.

Figure 11:
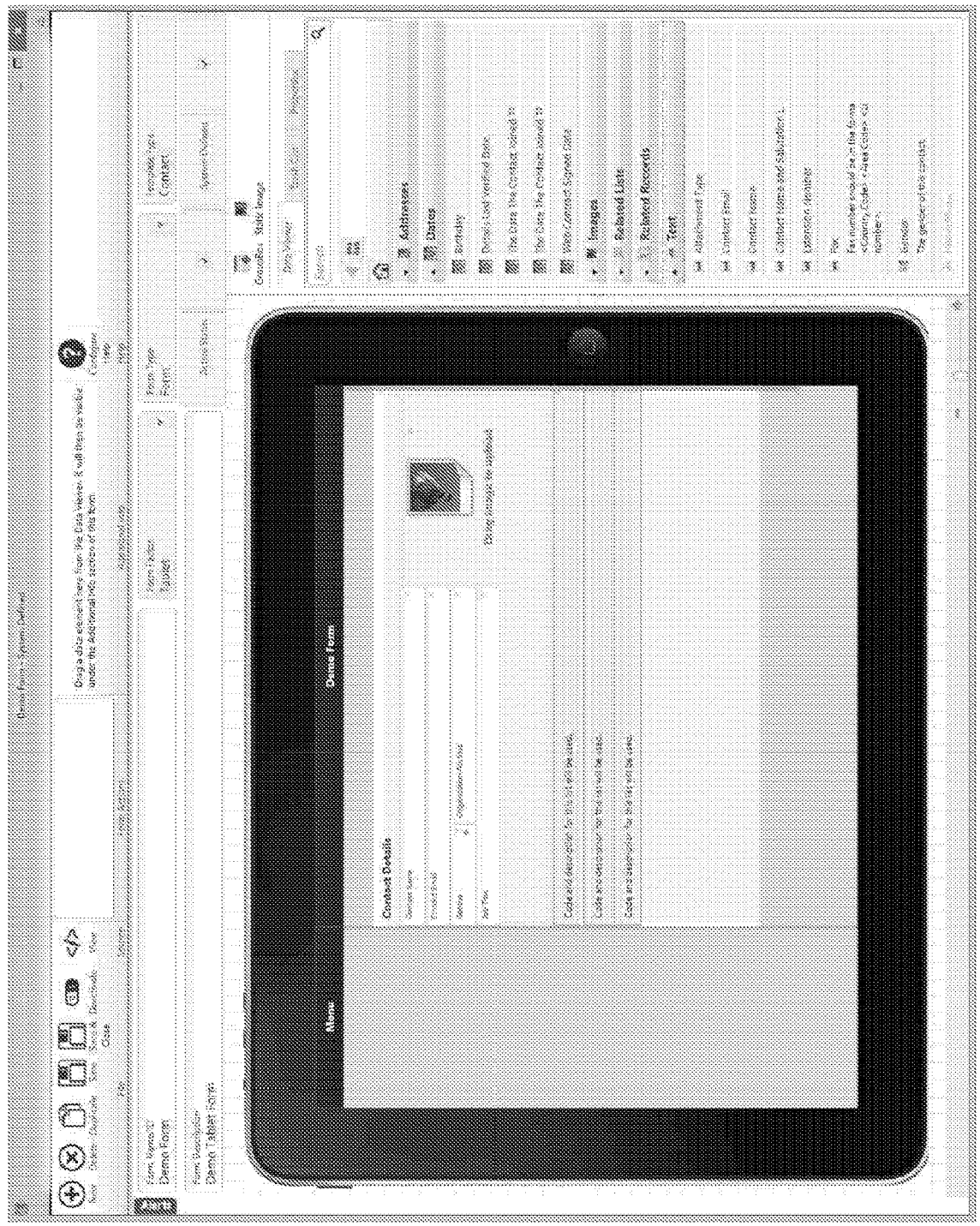
FIG. 11 shows an example of the form designer surface.

FIG. 11 shows an example of the form designer surface, with a few data elements and visual elements dragged on to the surface.

The below code shows the data representation, in Windows CE. XAML, JSON and HTML with KnockoutJS for a specific control—that being a "Textbox" control for display text/string information.

Windows CE

```
[
    {
        "type": "Label",
        "config": {
            "text": ~CaptionDetail~,
            "widthOverride": ~Width~,
            "height;": 15,
            "forFieldName": "~BindingPath~",
            "font": {
                "size": 8,
                "style": "bold"
            },
            "left": ~Left~,
            "top": ~Top~
        }
    },
    {
        "type": "TextBox",
        "config": {
            "widthOverride": ~Width~,
            "heightOverride": ~Height~,
            "left": ~Left~,
            "top": ~Top~,
            "name": "~BindingPath~",
            "multiline": ~MultiLine~,
            "disabled": ~IsReadOnly~
        },
        "events": {
            "enterkeydown": {
                "action": {
                    "method": "~OnSubmit~",
                    "fields": [
                        {
                            "name": "~BindingPath~",
                            "source": "field"
                        }
                    ]
                }
            }
        },
        "binding": {
            "name": "~BindingPath~"
        }
    }
]
```

HTML with KnockoutJS

```
<label
    for="~ControlID~"
    data-caption-detail="~CaptionDetail~" />
<input
    id="~ControlID~"
    type="text" data-role="gwTextBox"
    data-property="~BindingPath~"
    data-margin="~Margin~"
    data-padding="~Padding~"
    data-maxlength="~MaxLength~"
    data-readonly="~IsReadOnly~"
    data-textwrapping="~TextWrapping~"
    data-initial-focus="~IsInitialFocus~"
    data-caption-position="~CaptionPosition~"
    data-font-weight="~FontWeight~"
    data-character-casing="~CharacterCasing~"
    data-design-control-id="~DesignControlID~"
    data-can-be-hidden="~CanBeHidden~" />
```

Windows Desktop (WPF XAML)

```
<TextBox
    xmlns="http://schemas.microsoft.com/winfx/2006/xaml/presentation"
    xmlns:x="http://schemas.microsoft.com/winfx/2006/xaml"
    xmlns:meta="clr-namespace:CargoWise.Glow.UI.Infrastructure.MetaData;assembly=CargoWise.Glow.UI.Infrastructure"
    xmlns:infra="clr-namespace:CargoWise.Glow.UI.Infrastructure;assembly=CargoWise.Glow.UI.Infrastructure"
    xmlns:common="clr-namespace:CargoWise.Glow.UI.Controls;assembly=CargoWise.Glow.UI.Controls"
    infra:DesignerExtension.ControlType="TXT"
    Text="{meta:MetaDataBinding ~BindingPath~, Mode=~BindingMode~}"
    Grid.ColumnSpan="{infra:PlaceholderValue ColumnSpan}"
    Grid.Column="{infra:PlaceholderValue Column}"
    Grid.RowSpan="{infra:PlaceholderValue RowSpan}"
    Grid.Row="{infra:PlaceholderValue Row}"
    infra:ControlStateExtensions.ReadOnly="{infra:PlaceholderValue IsReadOnly}"
    Margin="{infra:PlaceholderValue Margin}"
    TextWrapping="{infra:PlaceholderValue TextWrapping}"
    FontWeight="{infra:PlaceholderValue Fontweight}"
    Style="{StaticResource InputTextBox}"
    infra:UIElementExtensions.CaptionPosition="{infra:PlaceholderValue CaptionPosition}"
    infra:UIElementExtensions.ElementCaptionOverride="{infra:PlaceholderValue CaptionOverride, Converter={StaticResource EmptyStringAsNullConverter}}"
    common:BPMDependencyProvider.SuppressDependencyContributions="{infra:PlaceholderValue SuppressDependencyContributions}"
    >
    <infra:PlaceholderExtensions.Placeholders>
        <infra:PlaceholdersContainer>
            <infra:Placeholder Name="BindingPath" Value="~BindingPath~" />
            <infra:Placeholder Name="BindingMode" Value="~BindingMode~" />
            <infra:Placeholder Name="ColumnSpan" Value="~ColumnSpan~" DefaultValue="4" />
            <infra:Placeholder Name="RowSpan" Value="~RowSpan~" DefaultValue="1" />
            <infra:Placeholder Name="Column" Value="~Column~" DefaultValue="0" />
            <infra:Placeholder Name="Row" Value="~Row~" DefaultValue="0" />
            <infra:Placeholder Name="IsReadOnly" Value="~IsReadOnly~" DefaultValue="False" />
            <infra:Placeholder Name="Margin" Value="~Margin~" DefaultValue="0" />
            <infra:Placeholder Name="TextWrapping" Value="~TextWrapping~" DefaultValue="NoWrap" />
            <infra:Placeholder Name="FontWeight" Value="~FontWeight~" DefaultValue="Normal" />
            <infra:Placeholder Name="IsInitialFocus" Value="~IsInitialFocus~" DefaultValue="False" />
            <infra:Placeholder Name="CaptionPosition" Value="~CaptionPosition~" DefaultValue="Top" />
            <infra:Placeholder Name="CaptionOverride" Value="~CaptionOverride~" />
            <infra:Placeholder Name="CanBeHidden" Value="~CanBeHidden~" DefaultValue="True" />
            <infra:Placeholder Name="DesignControlID" Value="~DesignControlID~" />
            <infra:Placeholder Name="SuppressDependencyConributions" Value="~SuppressDependencyContributions~" DefaultValue="False" />
        </infra:PlaceholdersContainer>
    </infra:PlaceholderExtensions.Placeholders>
</TextBox>
```

Form-Flow Designer

The form flow designer allows a business analyst to create a flow of how a user should experience the system. Flow may be defined as the tasks that a user can complete for a specific operational purpose. The flow may contain sequential tasks, parallel, tasks, optional tasks and mandatory tasks. Some of these tasks may have a user interface, whilst some may be background tasks. When a business analyst defines a form-flow template, they are able to 'visually' (using drag and drop) build a flow-chart of how a user will experience the system. This includes the ability to:

Show a form, for data entry

Execute a background process, such as sending XML messages to a party on the job Ask the user a question in order to determine the next step Make an automatic decision based on a condition that is evaluated against the job's data Essentially, this allows non-technical resources to build an entire functional system program, that can be executed, without the need for technical coding.

This flow definition is stored in the database and can be retrieved by any client application via a web service call. The client applications (Windows Desktop, HTML, Windows CE etc) are able to then interpret this form flow definition, and perform the relevant tasks—such as showing a form to the user etc. Each client platform has an implementation of each of the task types, which is also referred to as an execution engine. This allows a single form-flow to be interpreted on any of these platforms without modification.

Figure 12:
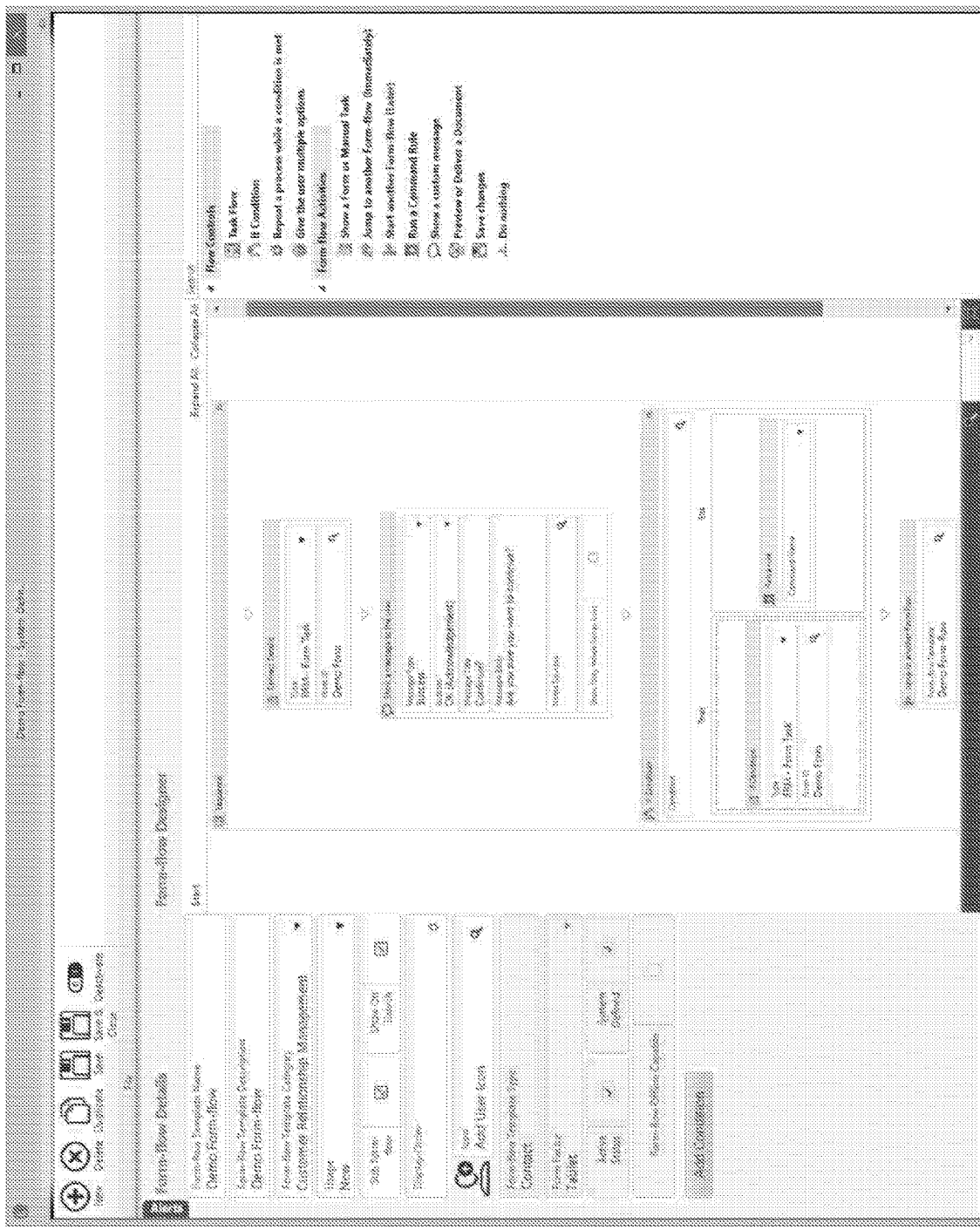
FIG. 12 shows an example of the form-flow designer surface.

FIG. 12 shows an example of the fa designer surface, with an example form-flow loaded.

Form and Form-Flow Configurator

The Form and Form-Flow Configurator allows a customer (end user) to configure forms and form-flows in their own system, to allow the system to be customised for their specific operations, or the specific operations of one part of their business, or even for a specific customer of theirs.

The Form Configurator controls how visual elements are displayed on a form: position, visibility (hidden/visible), and contents of certain elements, such as drop-down lists. Form-Flow Configurator allows to exclude certain parts of a form-flow that may not be applicable to a specific part of the business or a specific customer. Configuration Templates group configured items together by various parameters, such as Customer, Company, Branch, or Department. This allows users to specify the level at which a configuration template applies.

When a business analyst designs a form, he or she decides on a layout that works for the majority of users. The analyst indicates which visual elements are required, and which can be hidden by the user configuring the form. It is also possible to specify a list of additional elements that can be added to the form layout during configuration. This way the form layout can be changed within pre-defined constraints, maintaining supportability of the product. Additionally, the choices available within drop-down lists and search controls can be removed during configuration, so that only the items relevant to an area of business or a specific customer are displayed.

A form-flow may be designed to have multiple next steps, asking the user to make a selection. During form-flow configuration, some steps may be disabled, making it easier for the user to select a relevant step during run-time. Configuration Templates contain all of the above Configuration Items. A configuration template may be:

Default: applies to all users

Customer-specific: applies to users that belong to a specific customer

Company/Branch/Department-specific: applies to users that belong to a specific company, branch, or department Internally, configuration items are stored in the way that is most suitable for the type of item:

Form layout: the XAML of the configured form is stored.

List items: the excluded items are stored as XML.

Form-flow steps: the disabled steps are stored as XML.

Configuration item data format can be extended to store additional configuration types.

Figure 13:
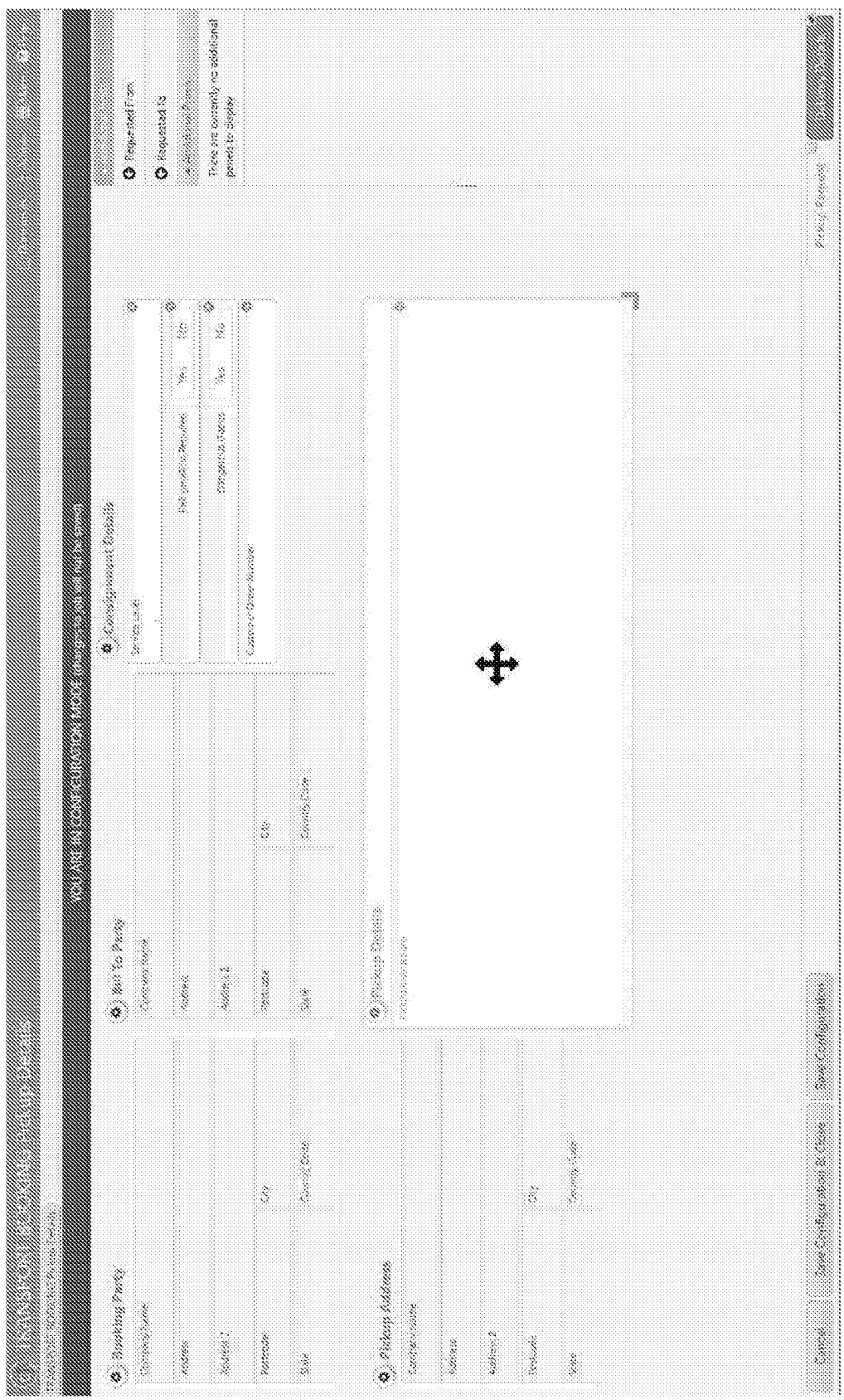
FIG. 13 shows a form-flow in configuration mode.

FIG. 13 shows a form-flow in configuration mode. In this example, the user removed several fields from a panel, disabled a form-flow step, and is about to move a panel around the form.

Figure 14:
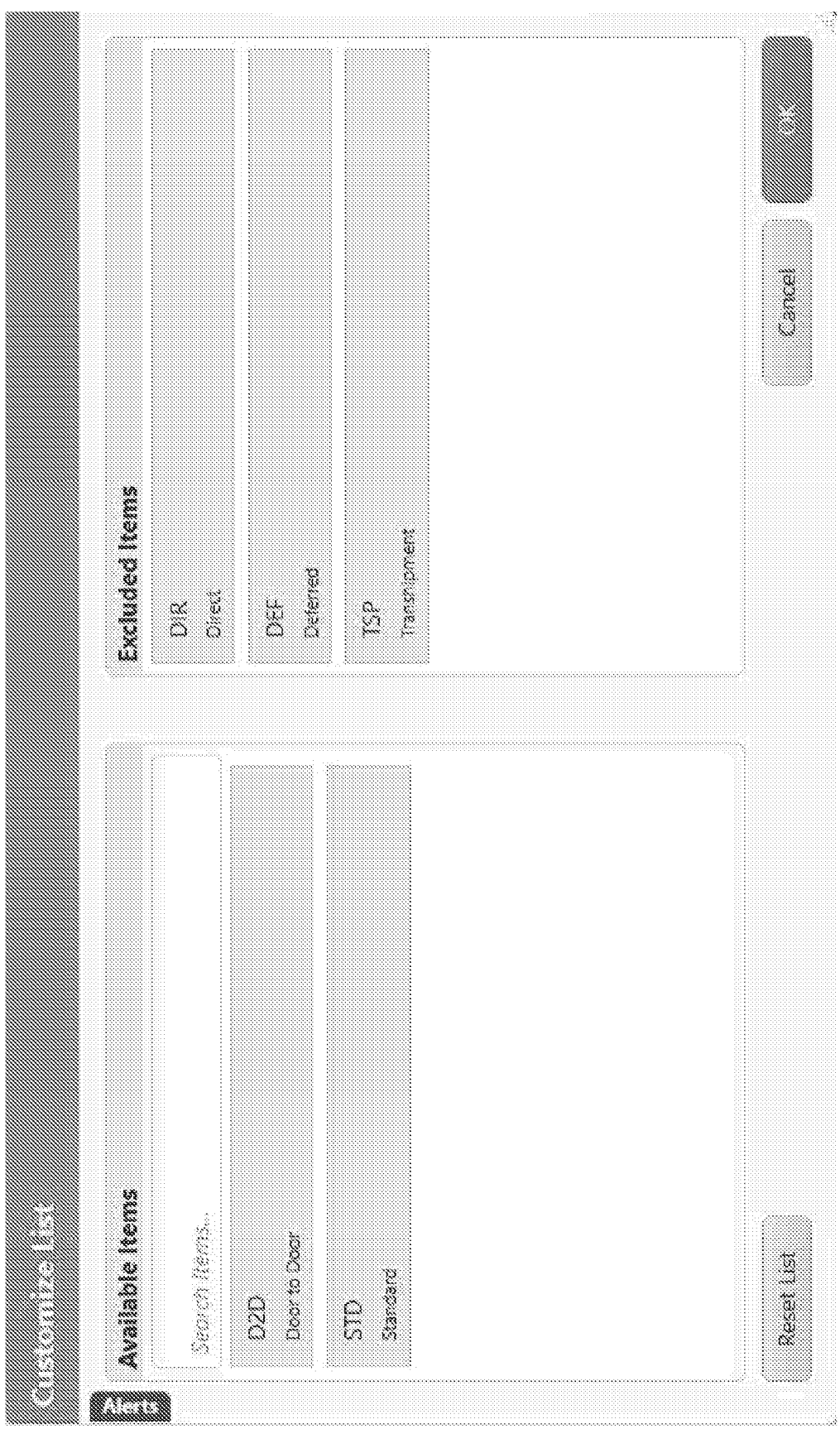
FIG. 14 demonstrates how a search control can be configured.

FIG. 14 demonstrates how a search control can be configured to exclude items that are irrelevant for a specific configuration.

The steps above may be performed by modules or other means within a corresponding computer system. This includes software means such as functions, classes, code files, libraries or objects as well as service means including middleware services connected by a message passing architecture. In other examples, means include hardware means, such as virtual machines, web servers, ASICs, FPGAs, CPUs and GPUs.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled. It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer system including a display screen and a processor, a user interface of the computer display screen for enabling a method of creating one or more executable form files and relating the one or more executable form files to a form flow process file that defines a logical pathway by which the one or more executable form files are accessed, the computer system including:

form flow process file storage for storing form flow process files, and form file storage for storing the one or more executable form files which is separate from the form flow process file storage, the method of the user interface, as performed by the processor of the computer system, comprising:

providing on the display screen form indicia representative of a plurality of executable form items on the display screen;

receiving first instructions by a user via the display screen to select a first form indicium of the form indicia;

selecting the first form indicium by the processor, wherein in response to the selecting of the first form indicium, a first execution control code is inserted that provides a first relevant control for a first executable form item;

displaying on the display screen the selected first form indicium as the first executable form item upon selection;

receiving second instructions by the user via the display screen to select a second form indicium of the form indicia;

selecting the second form indicium by the processor, wherein in response to the selecting of the second form indicium, a second execution control code is inserted that provides a second relevant control for a second executable form item;

displaying on the display screen the selected first form indicium as the first executable form item upon selection with the selected second form indicium as the second executable form item upon selection in an order as an executable form which comprises the plurality of executable form items, the executable form stored in the form file storage as the executable form file;

providing on the display screen executable form indicia representative of executable forms stored as the one or more executable form files on the form file storage and flow control indicia, the flow control indicia being representative of a plurality of logical pathways between the executable forms and a plurality of form flow processes stored as a plurality of form flow process files on the form flow process file storage;

receiving third instructions by the user via the display screen to select at least one flow control indicium of the flow control indicia and to select one or more of the executable form indicia;

selecting the at least one flow control indicium and the at least one executable form indicium by the processor, wherein in response to the selecting of the at least one flow control indicium and the at least one executable form indicium, the at least one executable form indicium invokes a relevant flow control;

displaying on the display screen a diagram representing a form flow process that includes the one or more executable forms in conjunction with the invoked relevant flow control, the form flow process stored in the form flow process file storage as the form flow process file;

communicating the form flow process file to a remote user device; and relating the form flow process file to the executable form file and the plurality of form flow process files, the form flow process file including a mapping to the executable form files and the plurality of form flow process files, wherein the form flow process file is stored on the remote user device, and the form flow process file, stored on the remote user device, configures the remote user device to evaluate conditional logic statements defined in the form flow process file that link the executable form files and the plurality of form flow process files together in multiple pathways and the user experiencing one of the multiple pathways based on an interaction of the user with the executable form defined in the executable form file, to make an automatic decision, based on the interaction of the user, by the remote user device, on which executable form file to request or retrieve from the form file storage and which of the plurality of form flow process files to request or retrieve from the form flow process file storage of the computer system.

2. The computer system of claim 1, wherein the method further comprises:
executing the first executable form item and the second executable form item of the executable form.

3. The computer system of claim 1, wherein receiving an instruction to select the first form indicium and the second form indicium is via a designer device that is configured to move the first form indicium and the second form indicium to another location on the display screen or another display screen, whereby the first form indicium and the second form indicium when moved become executable.

4. The computer system of claim 1, wherein the method further comprises:
changing the order of the selected second form indicium and first selected first form indicium wherein the first executable form item and the second executable form item are in another order.

5. The computer system of claim 1,
wherein indicia representative of the plurality of executable form items on the display screen is divided into categories of the plurality of executable form items.

6. A computer system including a display screen and a processor, a user interface of the computer display screen for enabling a method of creating one or more executable form files and relating the one or more executable form files to a form flow process file that defines a logical pathway by which the one or more executable form files are accessed, the computer system including:

form flow process file storage for storing form flow process files, and form file storage for storing the one or more executable form files which is separate from the form flow process file storage, the method of the user interface comprising:

providing on the display screen form indicia representative of a plurality of executable form items on the display screen;

receiving first instructions by a user via the display screen to select a first form indicium of the form indicia;

selecting the first form indicium by the processor, wherein in response to the selecting of the first form indicium, a first execution control code is inserted by the processor that provides a first relevant control for a first executable form item;

displaying on the display screen the selected first form indicium as a first executable form item upon selection, a first executable form stored in a computer storage as a first executable form file;

receiving second instructions by the user via the display screen to select a second form indicium of the form indicia;

selecting the second form indicium by the processor, wherein in response to the selecting of the second form indicium, a second execution control code is inserted by the processor that provides a second relevant control for a second executable form item;

displaying on the display screen the selected second form indicium as the second executable form item upon selection with the selected first form indicium in an order which comprises the first executable form and the second executable form item;

repeating steps of:
providing on the display screen the form indicia representative of the plurality of executable form items on the display screen,
receiving the first instructions,
selecting the first form indicium,
displaying on the display screen the selected first form indicium,
receiving the second instructions,
selecting the second form indicium, and
displaying on the display screen the selected second form indicium to generate a second executable form; and
displaying on the display screen the second executable form, the second executable form stored in the form file storage as a second executable form file;
providing on the display screen executable form indicia representative of executable forms stored as the one or more executable form files on the form file storage and flow control indicia, the flow control indicia being representative of a plurality of logical pathways between the executable forms and a plurality of form flow processes stored as a plurality of form flow process files on the form flow process file storage;
receiving third instructions by the user via the display screen to select at least one flow control indicium of the flow control indicia and to select one or more of the executable form indicia;
selecting the at least one flow control indicium and the at least one executable form indicium by the processor, wherein in response to the selecting of the at least one flow control indicium and the at least one executable form indicium, the at least one executable form invokes a relevant flow control;
displaying on the display screen a diagram representing a form flow process that includes the one or more executable forms in conjunction with the invoked relevant flow control, the form flow process stored in the form flow process file storage as the form flow process file;
communicating the form flow process file to a remote user device; and
relating the form flow process file to the first executable form file, the second executable form file, and the plurality of form flow process files wherein the form flow process file is stored on the remote user device, and the form flow process file, stored on the remote user device, configures the remote user device to evaluate conditional logical statements defined in the form flow process file that link the executable form files and the plurality of form flow process files together in multiple pathways and the user experiencing one of the multiple pathways based on an interaction of the user with one or more of the first executable form defined in the first executable form file and the second executable form defined in the second executable form file, to make an automatic decision, based on the interaction of the user, by the remote user device, on which of the first executable form file and the second executable form file to retrieve from the form file storage and which of the plurality of form flow process files to request or retrieve from the form flow process file storage of the computer system.

7. The computer system of claim 6, wherein the method further comprises:
providing flow indicia representative of flow controls on the display screen or another display screen;
receiving fourth instructions to select a first flow control indicium of the flow indicia to invoke a selected flow control;
receiving fifth instructions for arranging at least one of the first executable form and the second executable form in conjunction with the invoked selected flow control on the display screen or the another display screen; and
displaying on the display screen or the another display screen, a form flow diagram including the first executable form and the second executable form in conjunction with the invoked selected flow control.

8. A computer system including a display screen and a processor, a user interface of the computer display screen for enabling a method of creating an executable form file and relating the executable form file to a form flow process file, the computer system including:
form flow process file storage for storing form flow process files, and
form file storage for storing executable form files which is separate from the form flow process file storage,
the method of the user interface comprising:
sending, from a designer device to a server, a request to create a customizable form;
receiving, from the server, a first data message that includes multiple form items indicia representative of executable form items;
displaying on the display screen of the designer device the multiple form items indicia;
receiving first user input at the designer device, the first user input including a first selection of at least one of the multiple form items indicia, wherein in response to the first selection, the processor causes a first execution control code to be inserted that provides a relevant control for an executable form item and when displayed, the form item is the executable form item upon selection;
transmitting, to the server, the first data message that includes the selected at least one of the multiple form items indicia;
receiving in the form file storage the executable form file that includes the selected at least one of the multiple form items indicia as the executable form item;
creating the form flow process file comprising the steps of:
sending, from the designer device to the server, a request to create a customizable form flow process;
receiving, from the server, a second data message that includes executable form indicia representative of executable forms stored as the executable form files on the form file storage and flow control indicia, the flow control indicia being representative of a plurality of logical pathways between the executable forms and a plurality of form flow processes stored as a plurality of form flow process files on the form flow process file storage;
displaying on the display screen of the designer device the executable form indicia and the flow control indicia;
receiving second user input at the designer device, the second user input including a second selection of at least one flow control indicium and one or more of the executable form indicia, wherein in response to the second selection, the processor causes a second execution control code to be inserted that invokes a relevant flow control and when displayed, the flow control indicium is a diagram representing a form flow process that includes the one or more executable forms in conjunction with the invoked relevant flow control; and transmitting, to the server, the second data message that includes the selected at least one of the flow control indicia and the at least one executable form indicia;

receiving in the form flow process file storage the form flow process file that includes the selected at least one of the flow control indicia as the form flow process;

sending, from a remote user device to the server, the request for the form flow process file;

receiving, from the server, the form flow process file; and relating the form flow process file to the executable form file and the plurality of form flow process files, wherein the form flow process file is stored on the remote user device, and the form flow process file, stored on the remote user device, configures the remote user device to evaluate conditional logic statements defined in the form flow process file that link the executable form files and the plurality of form flow process files together in multiple pathways and the user experiencing one of the multiple pathways based on an interaction of the user with an executable form defined in the executable form file, to make an automatic decision, based on the interaction of the user, by the remote user device, on which executable form file to request or retrieve from the form file storage and which of the plurality of form flow process files to request or retrieve from the form flow process file storage of the computer system.

9. The computer system of claim 8, wherein the method further comprises displaying the customizable form on the display of the designer device and the displaying on the display of the designer device the multiple form items indicia includes displaying groups of the multiple form items indicia.

10. The computer system of claim 8, wherein the method further comprises executing the customizable form on the designer device.

11. The computer system of claim 8, wherein the method further comprises receiving third user input at the designer device, the third user input including a revision, addition, and/or deletion of the selection of the executable form items.

12. The computer system of claim 8, wherein the first user input includes selection of at least two of the multiple form items indicia, and further comprising:
receiving third user input at the designer device, the third user input including a revision, addition, and/or deletion of at least one of the selection of the multiple form items indicia and an order of the selection of the multiple form items indicia.

13. A computer system including a display screen to display a user interface for enabling a method of creating customizable form files and relating a customized form file to a form flow process file, the computer system including:
form flow process file storage for storing form flow process files, and
form file storage for storing customized form files which is separate from the form flow process file storage, the method comprising:
transmitting from a server to the computer display screen of a designer device multiple executable form items indicia, each of the multiple executable form items indicia representative of corresponding executable form items while not yet executable;
at the server, receiving first instructions from the designer device, the first instructions including a selection of at least one of the multiple executable form items indicia, wherein in response to the selection of the at least one of the multiple executable form items indicia, a first execution control code is inserted that provides a relevant control for an executable form item;

generating the customized form file that includes the corresponding executable form item having a first execution control associated therewith upon selection of the form item indicium;

storing the customized form file in the form file storage;

transmitting, from the server to the computer display screen of the designer device, executable form indicia representative of executable forms stored as executable form files on the form file storage and flow control indicia, the flow control indicia being representative of a plurality of logical pathways between the executable forms and a plurality of form flow processes stored as a plurality of form flow process files on the form flow process file storage;

at the server, receiving second instructions from the designer device, the second instructions including a selection of at least one flow control indicium and a selection of at least one executable form indicia, wherein in response to the selection of the at least one flow control indicium and the selection of the at least one executable form indicia, a second execution control code is inserted that invokes a relevant flow control;

generating the form flow process file that includes the corresponding form flow process having a second execution control associated therewith in response to the selection of the at least one flow control indicium and the selection of the at least one executable form indicia;

storing the form flow process file in the form flow process file storage;

communicating the form flow process file to a remote user device; and relating the form flow process file to the executable form files and the plurality of form flow process files, wherein the form flow process file is stored on the remote user device, and the form flow process file configures the remote user device to evaluate conditional logic statements defined in the form flow process file that link the customized form files and the plurality of form flow process files together in multiple pathways, and the user experiencing one of the multiple pathways based on an interaction of the user with a customized form defined in the customized form file, to make an automatic decision, based on the interaction of the user, by the remote user device, on which customized form file to request or retrieve from the form file storage and which of the plurality of form flow process files to request or retrieve from the form flow process file storage of the computer system.

14. The computer system of claim 13, wherein the executable form item is executable in the customized form.

15. A method of creating multiple customizable forms, wherein customized form files are stored in a form file storage and form flow process files are stored separately in a form flow process file storage, the method comprising:
transmitting from a server to a designer device multiple form items indicia for display, each of the multiple form items indicia being representative executable form items;

at the server, receiving first instructions from the designer device, the first instructions including a selection of at least one of the multiple form items indicia, wherein in response to the selection of the at least one of the multiple form items indicia, a first execution control code is inserted that provides a relevant control for an executable form item;

displaying in a form the selected at least one of the multiple form items indicia, wherein the selected at least one of the multiple form items indicia becomes the executable form item upon selection;

transmitting, from the server to the designer device, executable form indicia representative of executable forms stored as executable form files on the form file storage and flow control indicia, the flow control indicia being representative of a plurality of logical pathways between the executable forms and a plurality of form flow processes stored as a plurality of form flow process files on the form flow process file storage;

at the server, receiving second instructions from the designer device, the second instructions including a selection of at least one flow control indicium and a selection of at least one executable form indicium, wherein in response to the selection of the at least one flow control indicium and the selection of the at least one executable form indicium, a second execution control code is inserted that invokes a relevant flow control;

displaying on the display screen a diagram representing a form flow process that includes the one or more executable forms in conjunction with the invoked relevant flow control, the form flow process stored in the form flow process file storage as a form flow process file;

communicating the form flow process file to a remote user device; and relating the form flow process file to the executable form files and the plurality of form flow process files, wherein the form flow process file is stored on the remote user device, and the form flow process file configures the remote user device to evaluate conditional logic statements defined in the form flow process file that link the customized form files and the plurality of form flow process files together in multiple pathways, and a user experiencing one of the multiple pathways based on an interaction of the user with a customized form defined in one of the customized form files, to make an automatic decision, based on the interaction of the user, by the remote user device, on which of the multiple customized form files to request or retrieve from the form file storage and which the plurality of form flow process files to request or retrieve from the form flow process file storage of the computer system.

16. The method of claim 15, wherein the first instructions include a selection of at least two of the multiple form items indicia, and further comprising:

at the server, receiving third instructions from the designer device, the third instructions including an order of the selected at least two of the displayed multiple form items indicia.

17. The method of claim 15, wherein the first instructions and the second instructions are simultaneously sent as a combined instruction to the server.

18. The method of claim 15, wherein the method includes:

performing the method of claim 15, to create a first customizable form, and performing the method of claim 15 to create a second customizable form, storing the first customizable form and the second customizable form in a form database, and linking the first customizable form and the second customizable form with a flow control to form the form flow process file.

19. The method of claim 15, further comprising sending the one of the customized form files to at least one of the designer device and the remote user device.

20. The method of claim 19, further comprising, at the server, receiving third instructions from the designer device, the third instructions including a revision, addition, and/or deletion of at least one of the multiple form items indicia.

* * * * *